United States Patent
Inomata et al.

(10) Patent No.: US 9,959,649 B2
(45) Date of Patent: May 1, 2018

(54) IMAGE COMPOSITING DEVICE AND IMAGE COMPOSITING METHOD

(71) Applicant: Morpho, Inc., Tokyo (JP)

(72) Inventors: Teppei Inomata, Tokyo (JP); Kojiro Kato, Tokyo (JP); Masaki Satoh, Tokyo (JP); Kouta Kurihara, Tokyo (JP); Kazuki Kimura, Tokyo (JP); Ryo Ono, Tokyo (JP)

(73) Assignee: MORPHO, INC., Tokyo (JP)

( * ) Notice: Subject to any disclaimer, the term of this patent is extended or adjusted under 35 U.S.C. 154(b) by 0 days. days.

(21) Appl. No.: 15/157,422

(22) Filed: May 18, 2016

(65) Prior Publication Data

US 2016/0328873 A1    Nov. 10, 2016

Related U.S. Application Data

(62) Division of application No. 14/259,941, filed on Apr. 23, 2014, now Pat. No. 9,355,486.

(30) Foreign Application Priority Data

Apr. 24, 2013   (JP) .................................. 2013-091815

(51) Int. Cl.
    *G06K 9/00*     (2006.01)
    *G06T 11/60*    (2006.01)
    *G06T 7/33*     (2017.01)

(52) U.S. Cl.
    CPC .......... *G06T 11/60* (2013.01); *G06K 9/00624* (2013.01); *G06T 7/33* (2017.01); *G06T 2207/10004* (2013.01)

(58) Field of Classification Search
    CPC .................. G06K 9/00624; G06T 7/33; G06T 2207/10004; G06T 11/60

USPC .......................................................... 382/103
    See application file for complete search history.

(56) References Cited

U.S. PATENT DOCUMENTS

9,189,683 B2 * 11/2015 Moriyama ......... G06K 9/00228

FOREIGN PATENT DOCUMENTS

| JP | H06141288 | 5/1994 | |
|---|---|---|---|
| JP | H0922466 | 1/1997 | |
| JP | 2006005452 | 1/2006 | |
| JP | 2011066717 | 3/2011 | |
| JP | 5883173 B2 * | 3/2016 | ............... A61B 3/10 |
| WO | WO 2015046500 A1 * | 4/2015 | ............... G06F 3/01 |

OTHER PUBLICATIONS

"Office Action of Japan Counterpart Application," dated Dec. 26, 2017, p. 1-p. 11.

* cited by examiner

*Primary Examiner* — Gregory F Cunningham
(74) *Attorney, Agent, or Firm* — JCIPRNET

(57) ABSTRACT

It is an object to generate a desired composite image in which a motion area of a subject is correctly composited.
A difference image between a base target and an aligned swap target is generated (S1021), and an extracted contour in the difference image is determined according to the active contour model (S1022). The inner area of the contour and the outer area of the contour are painted with different colors to be color-coded so as to generate a mask image for alpha blending (S1023). Using the mask image thus generated, the swap target that is aligned with respect to the base target is composited with the base target of the base image by alpha blending (S1024).

16 Claims, 29 Drawing Sheets

The contour by ACM (a) 0 TIME (b) 50TH TIMES (c) 100TH TIMES (d) 150TH TIMES (e) 200TH TIMES (f) 300TH TIMES

| DEGREE OF OVERLAP OF CONTOURS (CUMULATIVE NUMBER OF INTERSECTED CONTOURS) | REPLACEABILITY | COLOR OF REPLACEABLE AREA |
|---|---|---|
| 0 | HIGH | BLUE |
| 1~3 | MODERATE | GREEN |
| 4~7 | CAUTION | YELLOW |
| 8~9 | NOT RECOMMENDED | RED |

IMAGE COMPOSITING DEVICE AND IMAGE COMPOSITING METHOD

This application is a divisional application of and claims the priority benefit of a prior U.S. application Ser. No. 14/259,941 filed on Apr. 23, 2014, now allowed, which claims the priority benefit of Japanese Patent Application No. 2013-91815, filed on Apr. 24, 2013. The entirety of each of the above-mentioned patent applications is hereby incorporated by reference herein and made a part of this specification.

TECHNICAL FIELD

The present invention relates to an image compositing device that generates a desired image by compositing a plurality of images, and an image compositing method that are performed in the image compositing device.

BACKGROUND ART

If a subject to be photographed is something that moves, such as a man or an animal, it is generally difficult to photograph an image at the moment the subject is in a suitable condition to be photographed. In particular, when taking a group photo or the like, it is very difficult to photograph an image at the moment all of a plurality of subjects are in a suitable condition to be photographed, for example, at the moment they are looking at the camera, smiling, and not blinking. Therefore, in many cases, at least one of the subjects on a photographed image is in an unfavorable condition.

In this respect, a technique known in the art is a method of generating a composite image where all of a plurality of subjects are in a good condition from a base image and another image (referred to as a comparative image) in which the plurality of subjects are photographed at different moments. For example, in an image compositing method disclosed in Patent Document 1, the contour of the face (or the face and body) of a subject is detected from each of a base image and a comparative image, and the area defined by each contour is extracted as a partial image. Then, if a subject is in a good condition in the base image, the subject area is left as it is. If a subject is in an unfavorable condition in the base image but in a good condition in the comparative image, the subject area of the comparative image is pasted over the subject area of the base image. A composite image where all subjects are in a good condition is thus generated.

On the other hand, techniques of generating the so-called cinemagraph are known in the art (for example, see Patent Document 2). A cinemagraph is a motion picture in which a predetermined area of the image moves while the other area remains still, which is generated by photographing a moving subject multiple times and compositing a series of the obtained images.

CITATION LIST

Patent Literature

Patent Document 1: JP 2001-45355A
Patent Document 2: JP 2012-199613A

Technical Problem

However, if a subject moves its head, he/she may move only the head or it may also move its body or arms as well as with the head. Therefore, if the contour of a certain part is stereotypically extracted from a comparative image and the area defined by the contour is pasted over the base image, or even if a processing such as edge blurring is further performed in pasting the area, the resulting composite image may look unnatural due to the inconsistency between the pasted area and the surrounding image area. For example, typical problems include discontinuity between the pasted area and the surrounding area, unnatural relative position of the face with respect to the body or arms, unnatural relative directions between the body parts, and the like. That is, if a subject moves, it has been difficult in conventional techniques to correctly composite images in a motion area of the subject so as to generate a desired composite image.

Further, since it is difficult to correctly generate a composite motion area, there are problems with generating a cinemagraph such as a subject in the motion picture being partially-lost and/or an unintended animated portion being displayed in addition to an intended subject, due to incorrect (insufficient/excessive) detection of motion area.

The present invention is to provide an image compositing device and the like in which the above-described problems are solved.

Solution to Problem

In order to solve the above-described problems, the following means are employed. The reference signs used in the following descriptions of the embodiments and the drawings are added in parentheses for reference. However, such additions in parenthesis merely show an example of the components of the present invention, and it should be understood that the components of the present invention are not limited thereto.

A first invention is:

an image compositing device, including:

a motion area detecting section (controller unit 101) to detect a motion area of a subject based on a base image and at least one comparative image that are photographed at different times (to detect the motion area based on the difference image, or to detect the motion area block in the normalized image based on the difference in image characteristic value between adjacent blocks);

a compositing area setting section (controller unit 101) to set a compositing area in the comparative image based on the detected motion area (to generate the image compositing mask that corresponds to the extracted contours, or to generate the image compositing mask that corresponds to the sum of the motion area block or the image compositing mask for the respective comparative images); and a composite image generating section (controller unit 101) to composite the set compositing area with the base image so as to generate a composite image (to perform the compositing processing of compositing the base image and the comparative image by using the image compositing mask).

By the first invention, it is possible to obtain a desired composite image in which the compositing area in the comparative image, which is set based on the motion area of the subject, is composited with the base image.

As a second invention, the image compositing device according to the first invention may be configured such that:

the motion area detecting section extracts a contour in a difference image between the base image and the comparative image (extracts the contour that encloses the motion area of the subject); and the compositing area setting section sets the compositing area based on the contour extracted in the difference image (generates the image compositing mask based on the contour that encloses the motion area of the subject).

By the second invention, the compositing area is set based on the contour extracted in the difference image between the base image and the comparative image. Therefore, it is possible to obtain a desired compositing image in which the contour is correctly composited.

As a third invention, the image compositing device according to the second invention may be configured such that:

the motion area detecting section extracts the contour (extracts the contour by using ACM (active contour model)) by setting an closed curve in an initial state so that the closed curve encloses a predetermined subject area in the difference image (initializing the contour such that an oval, which is an initial shape of the contour, has a diameter that gives the lowest sum of brightness values on the contour), and shifting nodes that define the closed curve in a direction in which an energy function of the closed curve is optimized (the energy function: expressions (1) and (2)) (performing the greedy search).

By the third invention, the contour is correctly extracted by means of the optimization technique using the energy function.

As a fourth invention, the image compositing device according to the third invention may be configured such that:

it further includes: a boundary setting section (controller unit 101) to set a boundary between the plurality of subject area (to set the boundary that is located at a same distance from the center coordinate of each face area), wherein the motion area detecting section sets the closed curve in the initial state so that the closed curve does not have an intersection with the boundary (sets the closed curve in the initial condition such that the closed curve encloses the subject area but does not intersect with the set boundary).

By the fourth invention, it is possible to prevent interference between the plurality of subject areas. As a result, it is possible to improve the availability of the contour detection of the subject area.

As a fifth invention, the image compositing device according to the third invention may be configured such that:

the motion area detecting section resets the closed curve that encloses a subject area determined according to a user operation in the initial state (tap gesture, drug gesture) among the subject area enclosed by the extracted contour (if the extracted contour encloses a plurality of subjects, resets the closed curve to exclude a subject area specified by a user operation), and extracts the contour again by using the closed curve.

By the fifth invention, if the contour detection is not performed desirably, it is possible to extract the contour again in response to a user operation.

As a sixth invention, the image compositing device according to the second invention may be configured such that:

it further includes: a base area displaying section (display unit 103) to display a plurality of base areas (the base target) that includes a predetermined subject area in the base image in a selectable manner by a user (by a user's tap gesture or operation of an icon); and a swap area candidate displaying section (display unit 103) to specify a plurality of swap area candidates in the respective plurality of comparative image, wherein the plurality of swap area candidates correspond to a base area selected based on a user operation, (the rectangular area as a candidate of the swap target), and to display the specified plurality of swap candidate areas in a selectable manner by the user (by a user's tap gesture or operation of an icon), wherein the motion area detecting section extracts the contour in the difference image between the base area selected based on the user operation and a swap area that is one of the plurality of swap area candidates selected based on a user operation (extracts the contour of the subject from the difference image between the base target and the swap target selected by the user).

By the sixth invention, it is possible to display the base area that includes a predetermined subject area and the swap candidate areas specified in the respective comparative images in a selectable manner by the user, and to correctly extract the contour in the difference image between the base area and the swap area selected by the user.

As a seventh invention, the image compositing device according to the first invention may be configured such that:

it further includes: an interference determining section (controller unit 101) to determine an interference of a predetermined subject with at least one of other subject when replacing the predetermined subject in the base image (a predetermined person in the base image) with the predetermined subject in the comparative image (the degree of overlap between the contours of the subject areas or the overlapped area between the contour areas), and a replaceability displaying section (display unit 103) to display a replaceability related to the predetermined subject based on the interference (replaceability selected from several levels).

By the seventh invention, it is possible for the user to ascertain the replaceability of a predetermined subject by determining the interference between the predetermined subject and the other subjects in the base image.

Further, as another invention, the image compositing device according to the first invention may be configured such that:

it further includes: an interference determining section (controller unit 101) to determine an interference of a first subject (a predetermined person) with a second subject (at least one of the other persons) when replacing the first subject in the base image (the predetermined person in the base image) with the first subject in the comparative image (the degree of overlap between the contours of the subject areas, or the overlapped area between the contour areas), the first subject being the subject whose motion area is detected by the motion area detecting section; and a replaceability displaying section (display unit 103) to display a replaceability related to the first subject based on the interference (replaceability selected from several levels), wherein the compositing area setting section sets the first subject in the comparative image as the compositing area (the predetermined person in the comparative image is set as the area to be used for replacing the base image).

By the seventh invention, it is possible for the user to ascertain the replaceability of a first subject by determining the interference between the first subject and the second subjects in the base image. Furthermore, since the area of the first subject in the comparative image is set as the compositing area, it is possible to obtain a desired composite image in which the first subject area in the comparative image is composited with the base image.

Further, the image compositing device according to the seventh invention or the above-described another invention may be configured such that:

it further includes: a replaceable area setting section (controller unit 101) to set a replaceable area that includes the first subject in the base image (to set it based on the contour in the difference image between the base image and the comparative image, or to set it by optimal solution computing using the energy function (expression (4)) whose parameter is the distance from the subject to be replaced or the pixel value of the difference image between the base image and the comparative image), wherein the interference determining section determines the interference of the first subject included in the set replaceable area with the second subject.

By this invention, it is possible to set a replaceable area that includes the first subject, and to determine the interference of the first subject included in the replaceable area with the second subject.

As an eighth invention, the image compositing device according to the seventh invention may be configured such that:

the interference determining section determines the interference of the first subject with the second subject based on an intersection (the intersection of the contour of the subject) between the replaceable area of the first subject and a replaceable area of the second subject that are extracted in the difference image between the base image and the comparative image (the degree of overlap of the contour).

By the eighth invention, it is possible to correctly determine the interference of the first subject with the second subject based on the intersection between the replaceable area extracted from the difference image between the base image and the comparative image.

As a ninth invention, the image compositing device according to the eighth invention may be configured such that:

the interference determining section determines the interference of the first subject with the second subject based on the number of intersection of a plurality of contours of the first subject with a plurality of contours of the second subject (the cumulative number of intersected contours of subjects), the plurality of contours of the first subject and the second subject being extracted from the respective plurality of difference image between the base image and the plurality of comparative image.

By the ninth invention, it is possible to determine the interference of the first subject with the second subjects based on the number of intersections between the contour of the first subject and the contours of the second subject, which are both extracted from each difference image between the base image and the comparative image.

As a tenth invention, the image compositing device according to the second invention may be configured such that:

it further includes: a face area detecting section (controller unit 101) to detect a plurality of face areas (the face areas of the persons in the image) in the base image and the plurality of comparative image;

a characteristic value calculating section (controller unit 101) to calculate a characteristic value (the face characteristic value: front level, smile level, red-eye level, closed eye level and front level of line of sight) with respect to each of the plurality of face areas and each of the plurality of comparative image; and a comparative image determining section (controller unit 101) to determine a combination of the plurality of comparative image in which each of the plurality of face areas has the optimal calculated characteristic (the combination of the comparative images that gives the highest face score).

By the tenth invention, it is possible to correctly determine a combination of the comparative images to be used for extracting the contour based on the characteristic value of each face area detected in each comparative image.

As an eleventh invention, the image compositing device according to the second invention may be configured such that:

it further includes: a face area detecting section (controller unit 101) to detect a plurality of face areas in the base image and the plurality of comparative image (the face areas of the persons in the image);

a face area display section (display unit 103) to display the plurality of face areas detected in the base image and the plurality of the comparative image in a selectable manner by the user (in a selectable manner by a user's tap gesture or operation of an icon); and a comparative image selecting section (controller unit 101) to make a selection, wherein when replacing a first face area selected in the base image with the first face area in a selected comparative image, if an interference of the first face area with a second face area occurs, the comparative image selecting section selects a comparative image in which the second face area causes no interference and has an optimal characteristic value (the comparative image in which the other face areas causes no interference and has the highest face score) as an material for replacing the second face area.

By the eleventh invention, it is possible to display the face areas detected in the base image and each comparative image in a selectable manner by the user. Further, if there is interference of a predetermined face area with another face area in a comparative image, it is possible to correctly determine a comparative image to be used for replacing the predetermined face area, and to replace the face area.

As a twelfth invention, the image compositing device according to the first invention may be configured such that:

the motion area detecting section detects the plurality of motion area of the subject in respective combinations of the base image and the plurality of comparative image (detects the motion area in each of the difference image between the base image and the comparative images, or detects the motion area blocks based on the difference in image characteristic value between adjacent blocks in each combination of the base image and the comparative image), the compositing area setting section sets the plurality of compositing area based on the respective plurality of motion area detected in the respective combinations of the base image and the plurality of comparative image (generates the image compositing mask based on the motion area detected in each combination of the base image and the comparative image), and the composite image generating section sequentially composites the plurality of compositing area of the respective plurality of comparative image with the base image (composites the comparative image with the base image by using the image compositing mask).

By the twelfth invention, it is possible to obtain a cinemagraph, which is a composite image in which the compositing area of each comparative image is sequentially composited.

As a thirteenth invention, the image compositing device according to the twelfth invention may be configured such that:

the motion area detecting section divides the base image and the plurality of comparative image into judgment areas (blocks), and detects the plurality of motion area based on a relation (the function defined based on the image characteristic value, expressions (5) and (6)) of a predetermined characteristic value (the image characteristic value: brightness, color intensity, lightness, color difference) between pairs of corresponding judgment areas.

By the thirteenth invention, it is possible to correctly detect the motion area of the subject based on the predetermined characteristic value between pairs of corresponding judgment areas of the base image and the comparative image.

As a fourteenth invention,
the image compositing device according to the thirteenth invention may be configured such that:

the motion area detecting section uses brightness as the characteristic value, and detects the plurality of motion area based on the relation of brightness (a function defined based on the brightness, expressions (5) and (6)) between pairs of corresponding judgment areas (blocks).

By the fourteenth invention, it is possible to correctly detect the motion area of the subject based on the relation of brightness between the pairs of corresponding judgment areas of the base image and the comparative image. Since brightness particularly reflects a movement of the subject, the detection of the motion area based on brightness has high availability.

As a fifteenth invention,
the image compositing device according to the thirteenth invention may be configured such that:

the motion area detecting section changes a size of the judgment areas according to any one condition selected from a photographic condition (depth of focus), a feature of photographed images (the proportion of the area where an edge or bright difference is detected in the difference image between the base image and the comparative image) and a user operation (a pinch gesture (pinch-in/pinch-out gesture) on the touch panel).

By the fifteenth invention, it is possible to set suitable judgment areas for the photographed images by changing the size of the judgment areas according to various conditions and events.

As a sixteenth invention,
the image compositing device according to the thirteenth invention may be configured such that:

the motion area detecting section normalizes (normalizes block by block) the base image with respect to each of the judgment areas based on the relation of the predetermined characteristic value so as to generate a normalized image, and makes a determination as to whether each of the judgment areas is the motion area (makes a determination as to whether each block is the motion area) based on difference in the characteristic value (the difference in image characteristic value) between one judgment area (a certain block) and judgment areas adjacent to the judgment area (adjacent blocks adjacent to the certain block) in the normalized image.

By the sixteenth invention, it is possible to correctly detect the motion area of the subject based on the difference in image characteristic value.

As a seventeenth invention,
the image compositing device according to the thirteenth invention may be configured such that:

if one judgment area is determined not to be the motion area, but if a predetermined number or more of a judgment area (all four adjacent blocks adjacent to the certain block on the left, right, top and bottom) is determined to be the motion area among judgment areas adjacent to the judgment area, a same processing as for judgment areas of the motion area is performed on the judgment area (the certain block is treated as being determined to be the motion area, and the same processing for blocks of the motion area is performed on the certain block).

By the seventeenth invention, even if a certain judgment area is erroneously determined not to be the motion area although it is in fact the motion area, it is possible to treat such judgment areas as the motion area in setting the compositing area. Therefore, it is possible to improve the availability of the motion area determination.

As an eighteenth invention,
the image compositing device according to the thirteenth invention may be configured such that:

if one judgment area is determined to be the motion area, a determination of whether adjacent judgment areas adjacent to the judgment area (adjacent blocks) are the motion area is made based on a judgment criteria that leans toward the motion area compared to a judgment criteria for the judgment area (a lower threshold is set than the threshold for the certain block).

By the eighteenth invention, if a certain judgment area is determined to be the motion area, it is possible to adjust the determination so that the adjacent judgment areas are more likely to be determined to be the motion area.

As the nineteenth invention,
the image compositing device according to the thirteenth invention may be configured such that:

the compositing area setting section sets the plurality of compositing area that are common to the plurality of comparative image (set a common area in each comparative image to be composited with the base image) based on a sum of the plurality of motion areas (the OR area of the areas determined to be the motion area) detected in the respective combinations of the base image and the plurality of comparative image.

By the nineteenth invention, it is possible to set a compositing area common to each comparative image by obtaining the sum of the motion areas of the subject in the comparative images, and to use it for compositing them with the base image.

As a twentieth invention,
the invention according to the thirteenth invention may be configured such that:

the compositing area setting section sets the plurality of compositing area corresponding to the respective plurality of compositing image to be composited based on the respective plurality of motion area detected in the respective combination of the base image and the plurality of comparative image (sets the area to be composited with the base image with respect to each comparative image, and the compositing is performed with respect to each block such that only the comparative image that includes a movement with respect to the base image is composited with the base image).

By the twentieth invention, it is possible to set the compositing areas corresponding to the respective comparative images to be composited, and to use them for the compositing with the base image.

As a twenty-first invention,
the image compositing device according to the thirteenth invention may be configured such that:

the motion area detecting section is capable of performing the detection of the motion area based on an area specified by a user operation (an area specified by a user's drug gesture in the manual mode).

By the twenty-first invention, it is possible to detect the motion area based on an area specified by a user operation.

As a twenty-second invention, the image compositing device according to the thirteenth invention may be configured such that:

the motion area detecting section is capable of performing the detection of the motion area based on a predetermined area without any user operation (a predetermined area in the automatic mode, for example, all blocks).

By the twenty-second invention, it is possible to detect the motion area based on a predetermined area without any user operation.

A twenty-third invention is:

an image compositing method, including:

a motion area detecting step of detecting a motion area of a subject based on a base image and a comparative image that are photographed at different times;

a compositing area setting step of setting a compositing area of the comparative image according to the detected motion area; and a composite image generating step of compositing the set compositing area with the base image so as to generate a composite image.

By the twenty-third invention, it is possible to provide the image composing method that has the same advantageous effect as the first invention.

As a twenty-fourth invention, the image composing method according to the twenty-third invention may be configured such that:

in the motion area detecting step, a contour is extracted in a difference image between the base image and the comparative image, and in the compositing area setting step, the compositing area is set based on the contour extracted in the difference image.

By the twenty-fourth invention, it is possible to provide the image composing method that has the same advantageous effect as the second invention.

As a twenty-fifth invention, the image compositing method according to the twenty-third invention may be configured such that:

in the motion area detecting step, the plurality of motion area of the subject are detected in respective combinations of the base image and the plurality of comparative image, in the compositing area setting step, the plurality of compositing area are set based on the plurality of motion area detected in the respective combinations of the base image and the plurality of comparative image, and in the composite image generating step, the plurality of compositing area of the respective plurality of comparative image are sequentially composited with the base image.

By the twenty-fifth invention, it is possible to provide the image compositing method that has the same advantageous effects as the twelfth invention.

A twenty-sixth invention is:

a program (the image processing program stored in a storage such as memory unit 102 or a recording medium such as memory card 107) to make a computer (the processing unit (controller unit 101) of the image compositing device 10, or the processing unit (processor) of various electronic devices such as tablets and personal computers) execute the following steps of (execute the image processing (described below in the embodiments)):

a motion area detecting step of detecting a motion area of a subject based on a base image and a comparative image that are photographed at different times;

a composing area setting step of setting a compositing area of the comparative image according to the detected motion area; and a composite image generating step of compositing the set compositing area with the base image so as to generate a composite image.

By the twenty-sixth invention, it is possible to provide a program that has the same advantageous effects as the first invention.

As a twenty-seventh invention, the program according to the twenty-sixth invention may be configured such that:

in the motion area detecting step, a contour is extracted in a difference image between the base image and the comparative image, and in the compositing area setting step, the compositing area is set based on the contour extracted in the difference image.

By the twenty-seventh invention, it is possible to provide the program that has the same advantageous effect as the second invention.

As a twenty-eighth invention, the program according to the twenty-sixth invention may be configured such that:

in the motion area detecting step, the plurality of motion area of the subject are detected in respective combinations of the base image and the plurality of comparative image, in the compositing area setting step, the plurality of compositing area are set based on the plurality of motion area detected in the respective combinations of the base image and the plurality of comparative image, and in the composite image generating step, the plurality of compositing area of the respective plurality of comparative image are sequentially composited with the base image.

By the twenty-eighth invention, it is possible to provide the program that has the same advantageous effects as the twelfth invention.

A twenty-ninth invention is:

an image compositing device, including:

an compositing area setting section to set a plurality of compositing areas to be composited with a base image in a respective plurality of comparative images based on the base image and the plurality of comparative images that are photographed at different times (controller unit 101 to generate the motion area masks corresponding to the motion areas that are detected based on the respective difference images of the base image and the comparative images, or to generate the motion area masks corresponding to the motion areas that are determined based on the difference in image characteristic value between adjacent blocks with respect to each combination of the base image and the comparative images); and a composite image generating section to sequentially composite the set plurality of composite areas with the base image so as to generate a composite image in which an image in a compositing part of the base image changes with time (controller unit 101 to change the image in a specific area in the base image by sequentially compositing the comparative images with the base image by using the set motion area masks).

By the twenty-ninth invention, it is possible to obtain a cinemagraph in which the compositing areas of the respective comparative images are sequentially composited.

As a thirtieth invention, the image compositing device according to the twenty-ninth invention may be configured such that:

the compositing area setting section is capable of setting the plurality of compositing areas based on an area specified by a user operation in the base image (generating the motion area mask that corresponds to an area specified by a user's drug gesture, or generating the motion area mask by making a determination of the motion area on each of the blocks that at least partly include an area specified by a user's drug gesture)

By the thirtieth invention, it is possible to correctly set a desirable area as the motion area.

Advantageous Effects of the Invention

According to the present invention, it is possible to obtain a desired composite image by compositing the compositing area of the comparative image with the base image in which the compositing area is set according to the motion area of the subject.

DESCRIPTION OF EMBODIMENTS

Hereinafter, embodiments of the present invention will be described with reference to the appended drawings. In the following description of the drawings, identical components are indicated by the same reference signs, and repetitive descriptions may be omitted. Further, the dimensions of the drawings do not necessarily correspond to those in the description.

The following first and second embodiments are both methods that uses a plurality of photographed images of a moving subject taken at different times and composites a subject image area of a base image with a subject image area of a comparative image, so as to obtain a desired composite image.

First Embodiment

In this embodiment, the contour of subject movement is dynamically captured based on a difference image between a base image and each comparative image, and an area enclosed by the contour that reflects the movement of the subject is extracted and composited with the base image. Hereinafter, an image compositing device, an image compositing method and a program according to the first embodiment will be described.

Figure 1:
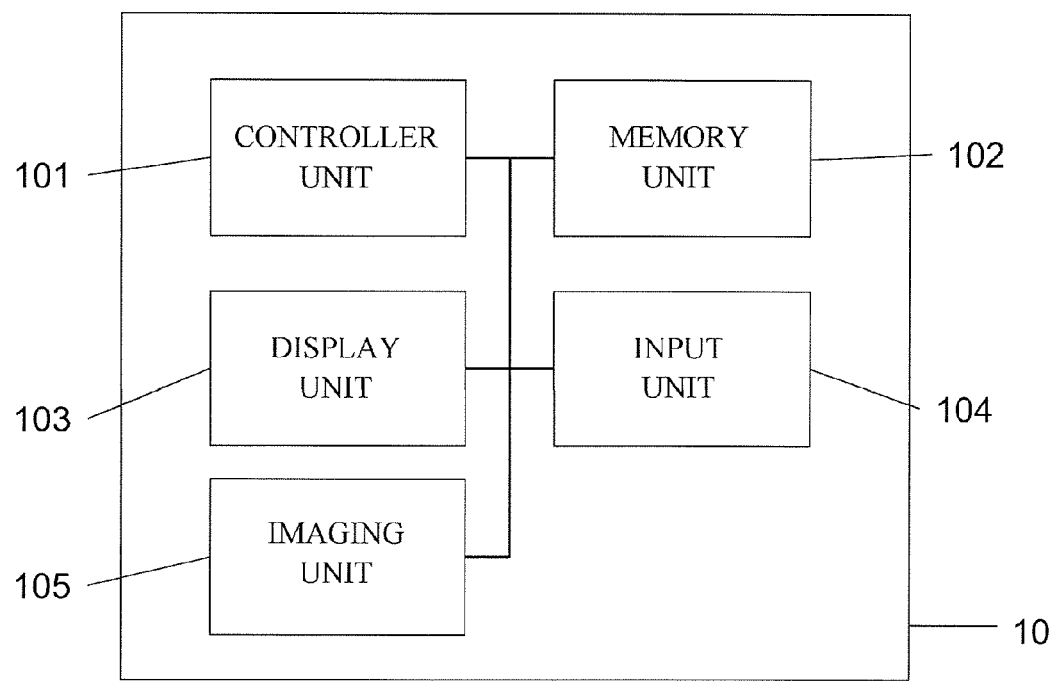
FIG. 1 is a hardware configuration diagram of an image compositing device.

FIG. 1 is a hardware configuration diagram of an image compositing device 10 according to the first embodiment of the present invention.

As illustrated in FIG. 1, the image compositing device 10 includes a controller unit 101 composed of a CPU (central processing unit) and the like, a memory unit 102 composed of a memory, a hard disk drive and the like, a display unit 103, an input unit 104 and an imaging unit 105. The image compositing device 10 is configured to perform the functions described below by the controller unit 101 executing programs stored in the memory unit 102. That is, the controller unit 101 is configured to be able to execute the programs stored in the memory unit 102. The memory unit 102, which is composed of a memory, a hard disk drive and the like as described above, is configured to be able to store image data photographed by the imaging unit 105 and the data that are generated by processing these image data with the programs executed by the controller unit 101 (e.g. difference image data and composited image data) as well as the programs executed by the controller unit 101. The display unit 103 is configured to be able to display the image data stored in the memory unit 102 and the like. The input unit 104 is integrally formed with the display unit 103 so as to be the so-called touch screen, and serves as an input interface between a user and the image display device 100. Specifically, when a user performs a tap or pinch gesture on the input unit 104 with his/her finger as if he/she were physically handling an image displayed on the display unit 103, the input unit 104 that detects these operations (touch gestures) determines their touch positions and movements and makes the controller unit 101 perform a corresponding processing. The imaging unit 105 is configured to be able to photograph images. The images photographed by the imaging unit 105 are stored in the memory unit 102 in the form of image data.

Figure 2:
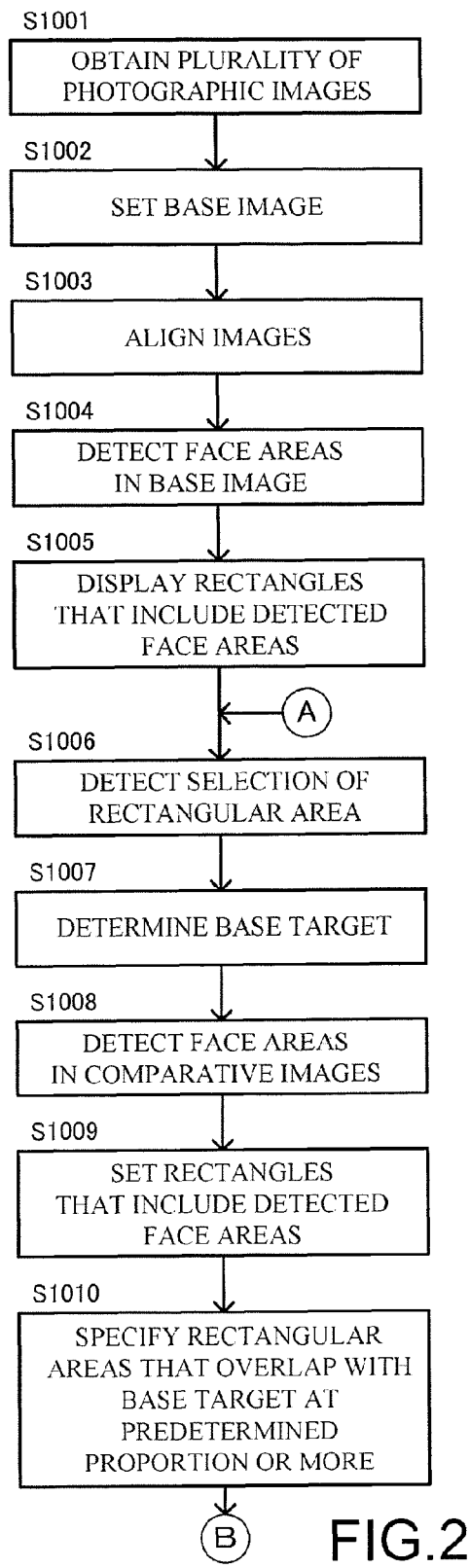
FIG. 2 is a flowchart of a processing performed in the image compositing device.
Figure 3:
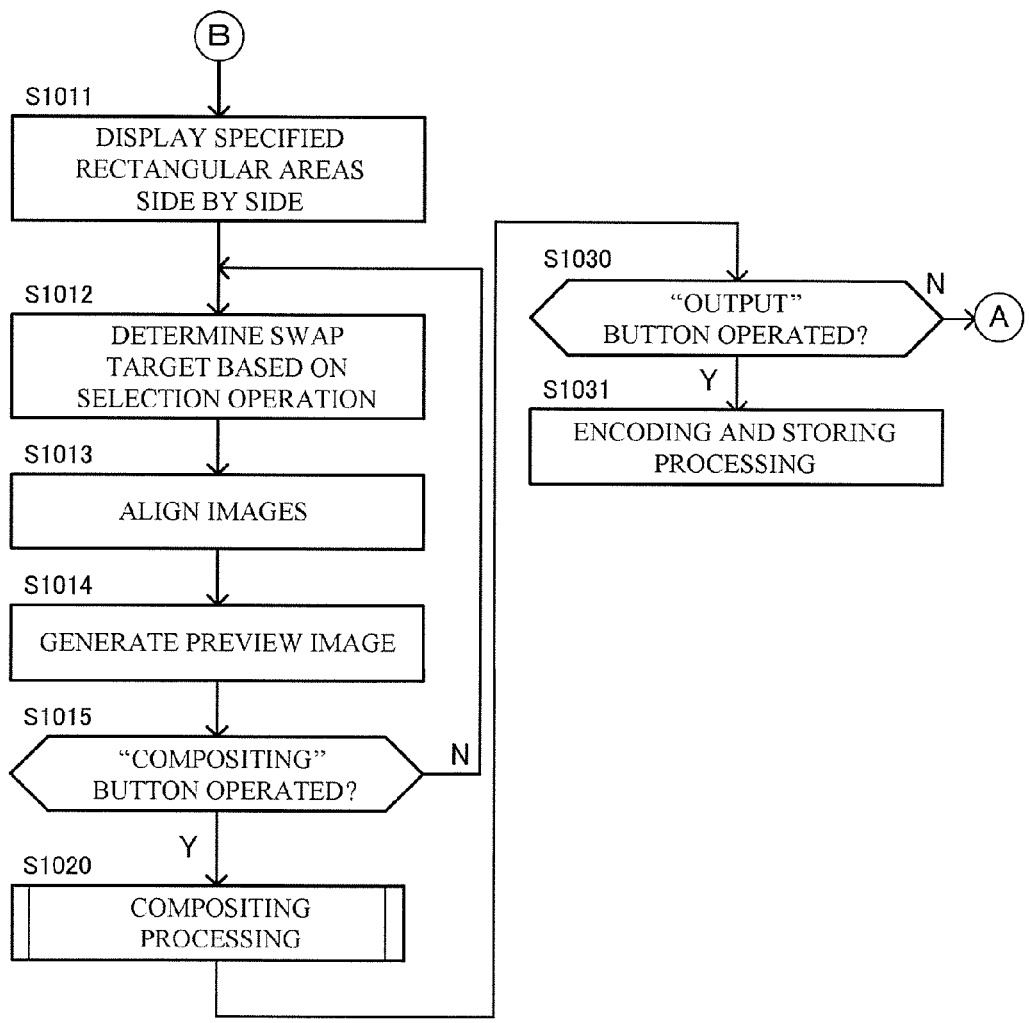
FIG. 3 is a flowchart illustrating a processing performed in the image compositing device.

Typical examples of the image compositing device 10 as illustrated in FIG. 1 include the so-called smartphones and tablets. However, the image compositing device 10 is not limited thereto, and may be other information terminal devices that are operable through a touch screen, a mouse or the like, such as PCs and digital cameras Hereinafter, a processing performed by the image compositing device 10 according to the first embodiment will be described with reference to the flowchart of FIGS. 2 and 3. An image compositing program, which is a part or all of the processing of FIGS. 2 and 3, is loaded into the memory and is executed by the CPU of the controller unit 101. In the following example, a group photo of a plurality of subjects is photographed. However, the subject may also be alone.

First, in the image compositing device 10, a user operates the imaging unit 105 by performing a predetermined photographing operation such as a tap gesture on a "photograph" button displayed on the display unit 103, so as to photograph (a plurality of) subjects multiple times to obtain the corresponding number of photographed images (S1001). A plurality of photographed images can be obtained by a single photographing operation, for example by using a serial photographing mode in which photographed image data are serially taken at predetermined time intervals such as tens of msec, hundreds of msec, 1 sec or several sec in response to a single photographing operation.

The plurality of photographed images thus obtained are stored in the memory unit 102. Then, a base image is chosen from among the photographed images (S1002). The base image may be set, for example, by automatically choosing the first photographed image or by displaying the plurality of photographed images on the display unit 103 to query the user to select an image to be the base image. For example, the user may be queried to select an image in which at least one of the plurality of subjects is photographed in a desired condition as the base image, and the area of the other subjects who are not photographed in a desired condition is replaced with the corresponding area of comparative images (images other than the base image) in which the subject is photographed in a desired condition.

After setting the base image, the comparative images are aligned with respect to the reference image (S1003) in order to cope with the existing misalignment between the base image and the comparative images due to camera shake or the like. In this embodiment, the alignment is performed by block matching. Other alignment techniques such as gradient method may also be used.

Figure 4:
FIG. 4 is a view illustrating an example of a base image displayed on a display unit.

After the alignment, face areas of the base image are detected (S1004). The face areas are detected, for example, by recognition using Haar-like features or by pattern matching. The face areas may be detected by any technique that can specify possible face areas in the base image regardless of whether hardware or software is used. Then, as illustrated in FIG. 4, rectangles enclosing the detected face areas are displayed on the base image (S1005). In this way, the device shows the detected face areas to the user so as to query him/her to make a determination as to whether the face areas are in a good condition in the base image. Furthermore, in this embodiment, the displayed rectangles suggest that the partial images in the rectangles are changeable to the corresponding partial images of the other images (comparative images).

When a user finds a rectangle that encloses a face area that is not photographed in an appropriate condition among the rectangles displayed in the base image, the user selects such rectangular areas by a tap gesture. Then, in response to detecting this selecting operation (S1006), a rectangular area to be changed (hereinafter referred to as a base target) is determined (S1007). If the input unit 104 is not a touch screen but a pointing device such as mouse, the base target is determined by the user placing the mouse cursor over a rectangular area enclosing a face area that he/she wants to change and clicking it.

Figure 5:
FIG. 5 illustrates rectangular areas of a base image and comparative images.

Then, as with the base image, face areas of the comparative images (which have been already aligned with respect to the base image as described above) are detected (S1008), and rectangles enclosing the face areas are set (S1009). Then, rectangular areas that overlap with the base target by a predetermined amount (e.g. ½) or more are specified (S1010), and the specified areas are arranged beside the base image as illustrated in FIG. 5 (S1011 in FIG. 3). That is, rectangular areas that include the same subject as that of the base target are specified in the comparative images that are taken before or after the base image. In this way, rectangular area candidates for replacing the base target are shown to the user. To be more specific, rectangular area candidates that include a partial image for overwriting the partial image of the base target are shown.

The rectangular area in the base image (base target) and the rectangular area candidates have a sufficiently large area with respect to the face area included in these rectangular areas. For example, these rectangular areas include the face area at the center, and have a length and a width equal to or longer than twice the face area (having an area of 400% or more of the face area). The purpose of the foregoing is to capture the movement of the face and to capture the movement of other body parts such as the neck, shoulders and chest associated with the face movement, and so as to generate a natural composite image in the compositing processing (describe below). That is, the purpose is to include a certain area around the face in the base target and a swap target.

When the user taps a rectangular area that includes a face area he/she considers to be appropriate from among the rectangular areas that are arranged side by side as illustrated in FIG. 5, the selected rectangular area is set as the swap target for replacing the base target in response to this selecting operation (S1012). In addition, the position of the swap target on the base image is determined (S1013). For example, the vicinity of the base target is scanned with the swap target to align it by block matching. Then, the swap target is simply overwritten (pasted over) at the determined position on the base image so as to generate a preview image (S1014). The alignment technique is not limited to block matching, but may be other techniques such as gradient method.

The user checks the preview image, and if he/she confirms that the subject in the swap target is in a good condition, he/she taps a "composite" button displayed on the display unit 103. If the user thinks the subject in the swap target is in an unfavorable condition, he/she selects a rectangular area of a comparative image other than the current swap target instead of tapping the "composite" button. If a tap gesture on the "composite" button is detected (S1015, Yes), a compositing processing (described below) is performed (S1020). If the rectangular area of another comparative image is selected without the "composite" button being tapped (S1015, No), the newly selected rectangular area is set as the swap target in place of the previous swap target before this selecting operation (S1012). In the above-described processing, the preview image may not be displayed, and the compositing processing may be performed immediately after the swap target is determined.

Figure 6:
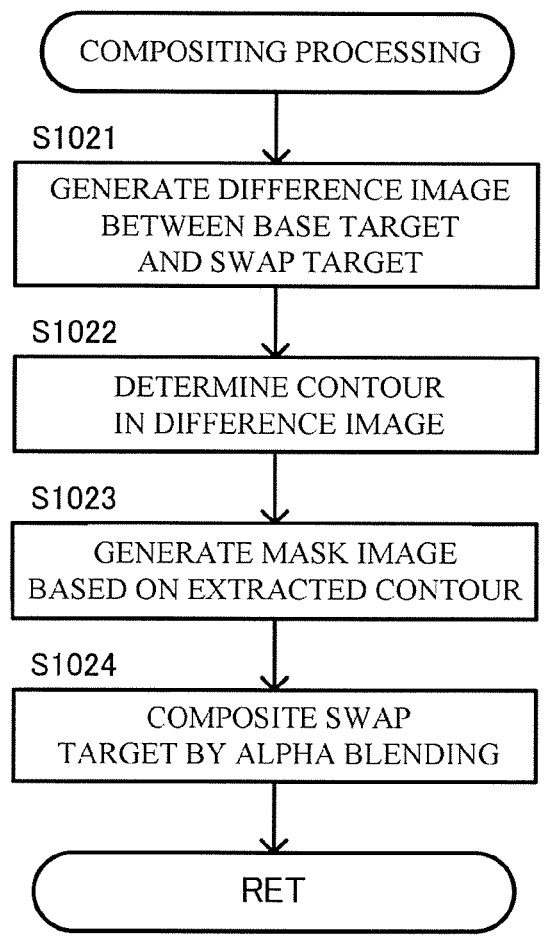
FIG. 6 is a flowchart illustrating a compositing processing.
Figure 7:
FIG. 7 is a view illustrating an example of a difference image.

Hereinafter, the compositing processing will be described with reference to the flowchart illustrated in FIG. 6. At the start of the compositing processing, the controller unit 101 generates a difference image between the base target and the aligned swap target (S1021). In the obtained difference image, high brightness indicates that the subject moves in the area as illustrated in FIG. 7. Next, a processing to determine an extracted contour in the difference image is performed (S1022). In the difference image, since high brightness indicates the subject moves in the area, the contour is determined so as to enclose the whole area with high brightness. The extracted contour thus determined defines an image area that includes the area where the subject moves. That is, the determination of the extracted contour based on the difference image enables movement of the subject to be captured. In this embodiment, the extracted contour is determined using ACM (Active Contour Model). However, other techniques may also be used instead.

Figure 8:
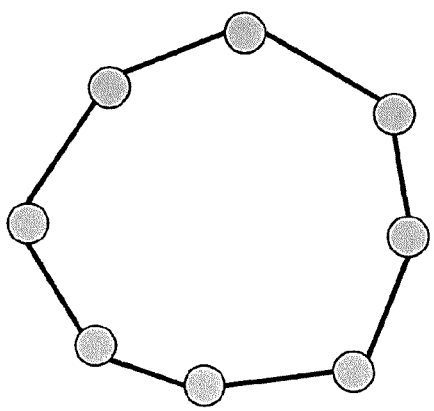
FIG. 8 is a view illustrating a contour according to an active contour model.

ACM is an algorithm for determining a contour. This model attempts to minimize a predefined energy function so as to determine a contour. As illustrated in FIG. 8, the contour is a closed curve composed of nodes and lines that connect the nodes, and an initial contour is deformed to an optimal contour according to energy minimization. The minimization of the energy function is performed typically by an iterative operation. The expression of the energy function is shown below.

[Expression 1]

$$E_{all} = k_1 E_{internal} + k_2 E_{edge} + k_3 E_{external} \quad (1)$$

Where, $E_{all}$, is the energy determined by the above energy function. Further, $E_{internal}$ is the energy representing the continuity of the contour, $E_{edge}$ is the energy representing the conformity of the contour to the edge, and $E_{external}$ is the energy representing the accumulation of the nodes to the center, which are represented as follows. Further, $k_1$, $k_2$ and $k_3$ are coefficients that respectively represent the weights of $E_{internal}$, $E_{edge}$ and $E_{external}$, and maybe predetermined fixed values for example.

[Expression 2]

$$E_{internal} = \left\| \frac{d\bar{v}}{ds}(s) \right\|^2 \quad (2\text{-}1)$$

$$E_{edge} = -|\nabla I(x, y)|^2 \quad (2\text{-}2)$$

$$E_{external} = Dist_{center}(x, y) \quad (2\text{-}3)$$

Where, let a closed curve on an image plane be represented by v(s)=(x(s),y(s)). Then, in the first equation, the first deviation of v(s) is a function representing the continuity of the contour, where "s" is the parameter representing the shape of the closed curve. In the second equation, I(x, y) is a function representing the brightness at a coordinate (x, y) on a subject image (difference image). Further, in the third equation, $Dist_{center}$(x, y) is a function representing the distance of a coordinate (x, y) from the gravity center.

Coefficients $k_1$, $k_2$ and $k_3$ in the energy function do not have to be fixed values, but may be variable according to the contents of photographed images, photographing conditions and user input and the like.

Figure 9:
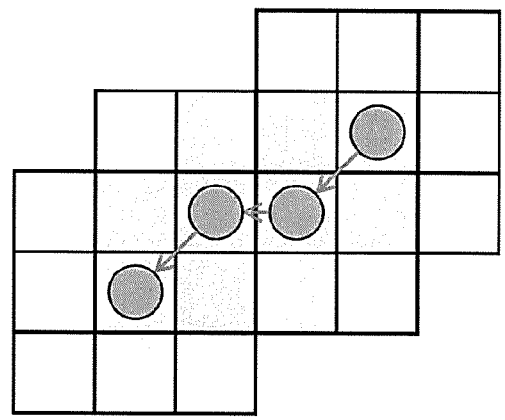
FIG. 9 is an explanatory view of a greedy search.

The minimization of the energy function is performed by means of a greedy search. As illustrated in FIG. 9, the greedy search calculates the energies at the surrounding eight pixels of a node pixel so as to shift the node pixel by pixel toward the coordinate having the minimal energy. Compared to gradient effect methods, the greedy search is advantageous in that it has a lower risk of overly shrinking the contour. In contrast, the convergence is relatively slow. However, since it is considered to be fast enough for tens of nodes, the greedy search is used in this embodiment.

Figure 10:
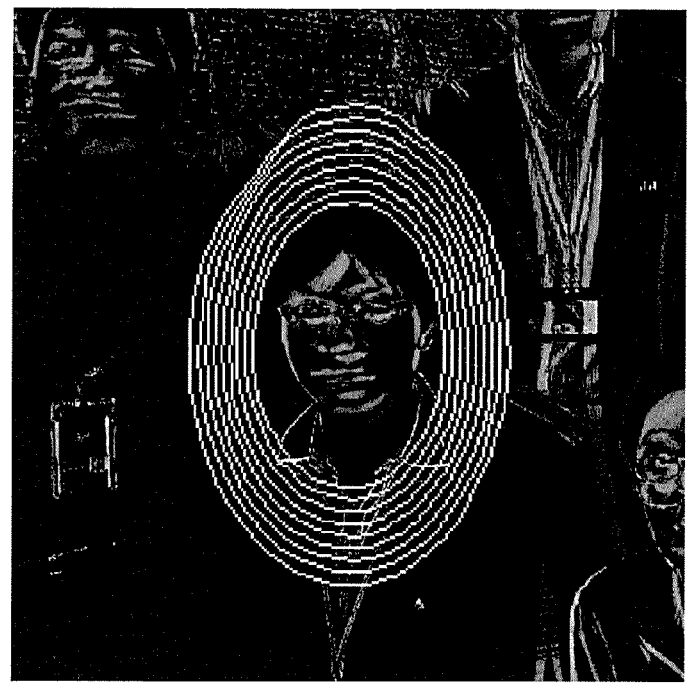
FIG. 10 is a view illustrating a process of setting an initial contour.

The initial contour (initial closed curve) before starting the greedy search is determined by the following method. First, as illustrated in FIG. 10, a tentative contour (ellipse in this embodiment) is set which encloses the face area detected in the difference image or the area corresponding to the face area that is previously detected in the base target or swap target from which the difference image is generated. Face area detection may be performed on the difference image, and the tentative contour may be set to enclose the detected face area. Then, the sum of the brightness values of the pixels on the tentative contour is calculated. Then, the diameter of the tentative contour is gradually expanded while calculating the sum of the brightness values on the tentative contour. In this way, the tentative contour having the minimal sum of the brightness values is set as the initial contour. This is based on an assumption that the subject moves in an area having high brightness. In this embodiment, the initial contour is firstly expanded to an area that is less affected by the subject movement, and thereafter the contour is gradually converged by shifting the nodes of the closed curve by the greedy search. That is, the initial contour is set to enclose areas where the subject has a potential to move as much as possible, and the subsequent contour deformation enables an optimal contour of the area where the subject moves to be determined.

Figure 11:
FIG. 11 are views illustrating convergence of a contour after different times of node shift.
Figure 11:
Figure 11:
Figure 11:
Figure 11:
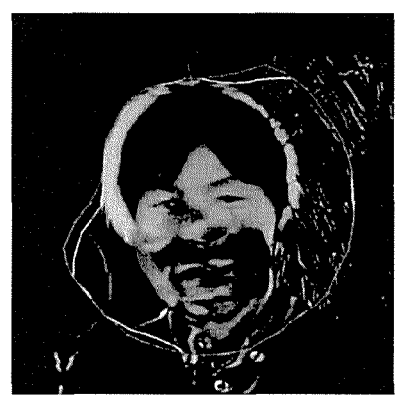
Figure 11:
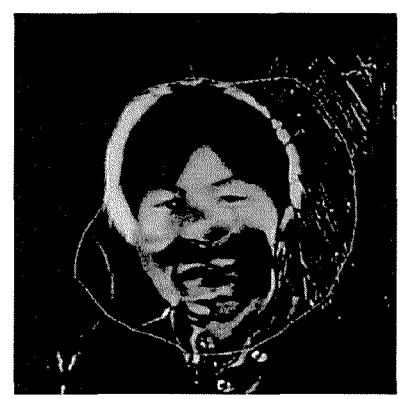

The initial contour thus set is gradually converged by performing the greedy search based on the energy function of the contour, and a contour having the minimum energy function is set as the extracted contour. FIG. 11 illustrates an example where the contour is gradually converged to be optimized (energy minimization) as the number of node shifts by the greedy search increases from 0 times (initial contour) to 50 times, to 100 times, to 150 times, to 200 times, and to 300 times. In this embodiment, the number of node shifts is limited to a maximum of 600 times. If the upper limit is reached, the contour at that point is set as the extracted contour even if the energy is not minimized, and the greedy search ends.

Figure 12:
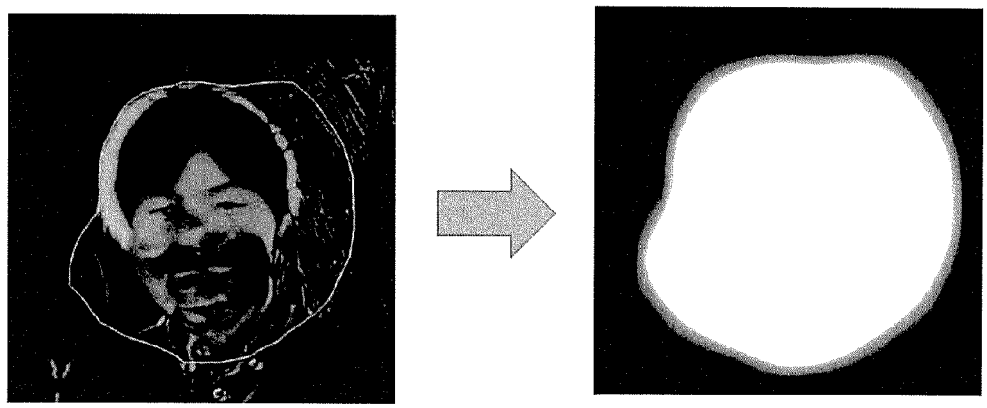
FIG. 12 is a view illustrating an example of a mask image for alpha blending.

Next, as illustrated in FIG. 12, the inner area of the contour and the outer area of the contour are painted with different colors (black (pixel value 0) and white (pixel value 255) in this embodiment) to be color-coded by means of flood fill or the like so as to generate a mask image for alpha blending (S1023). In this embodiment, the inner area of the contour is set to a transparent area.

Using the mask image thus generated, the swap target, which has been aligned with the base target, is composited with the base target of the base image by alpha blending (S1024). This compositing is performed according to the following expression.

In this embodiment, the mask image which is actually used for the compositing by alpha blending is not the above-described mask image that is color-coded black and white (hereinafter referred to as "original mask images"), but a modified mask image that is modified according to the following expression.

[Expression 3]

$$I_{result} = \max(\alpha * I_{blurred} | 0 \leq \alpha * I_{blurred} \leq 255, I_{mask}) \quad (3)$$

where $I_{mask}$ is the pixel value of an original mask image, $I_{result}$ is the pixel value of the modified mask image, and $I_{blurred}$ is the pixel value of a blurred mask image that is obtained from the original mask image by blur processing. Further, $\alpha$ is an adjustment factor for adjusting the pixel value $I_{blurred}$ of the blurred mask image.

As a result of the blur processing, boundaries in the original mask image are blurred. For example, if the pixel values around a contour vary from 255 (white) to 0 (black) along the inner area toward the outer area of the contour in the original mask image as illustrated in FIG. 12, the pixel values may be changed to be near the median value of 128 as a result of the blur processing, which results in an unintended shrinkage of the inner area of the contour. The adjustment factor $\alpha$ is a factor that raises the pixel values around the boundaries close to 255 in order to avoid such shrinkage. By this processing, it is possible to generate a modified blurred image that has smooth pixel value distribution while the inner area of a contour is not shrunk.

max(A, B) is a max function that outputs a larger value from among the values of A and B. The symbol "|" in the max function, which indicates definition of the numerical range of $\alpha \times I_{blurred}$, shows that the value of $\alpha \times I_{blurred}$ is limited within the range from 0 to 255.

The expression (3) outputs the larger value from among the values of $\alpha \times I_{blurred}$ and $I_{mask}$. In the case of the above-described example, the output values become 255 for the pixels in the inner area because their pixel values are both 255. In contrast, the output values become the values of $\alpha \times I_{blurred}$ for the pixels in the outer area of the contour because their values of $I_{mask}$ are 0.

As a result, only the outer area is blurred in the generated mask image. Around the boundary of the contour, the pixel value changes not drastically but gradually from the inner area to the outer area of the contour so as to make smooth pixel value distribution because the adjustment factor $\alpha$ raises the values of $I_{blurred}$.

With such blurring, the images are naturally blended (the brightness changes gradually) outside the contour while the image is completely replaced inside the contour.

Figure 13:
FIG. 13 is an example of a composite image obtained by alpha blending.

FIG. 13 illustrates an example of a composite image generated by alpha-blending using the above-described modified mask image. In other words, an image area corresponding to the extracted contour of the difference image is extracted from the swap target, and the extracted image area is applied (overwritten) to the base target on an image area corresponding to the extracted contour of the difference image. The other areas of the base target remain the same as the original base image except for the blurring area. As described above, the area affected by the movement of the subject is dynamically extracted based on the difference image, and only the extracted area is pasted. Therefore, it is possible to generate a composite image in which the subjects are in a desired condition and the composited area does not look unnatural.

Next, a determination is made as to whether an "output" button is tapped (S1030). If the button is not tapped but another rectangular area in the base image is selected (S1030, No), i.e. the user selects another rectangular area because it includes a subject in an unfavorable condition, the steps after S1006 are executed as described above so that a base target and a swap target are set and image compositing is performed similarly. If the "output" button displayed on the display unit 103 is tapped because all subjects are in a good condition in the generated composite image (S1030, Yes), the image is coded into a desired format such as JPEG and is stored in the memory unit 102.

(Elimination of Interference Between Face Areas)

As described above, the base target and the swap target are set to include a larger area than a face area. Therefore, if face areas are closely located to each other, for example in a group photo where many subjects gather, a single base target or swap target may include a plurality of face areas. In particular, in the case where a subject was located near the camera position while another subject was located away from the camera position, a large face area may be located near a small face area in the resulting image. In such cases, a large target area or swap area for the large face area is highly likely to include a plurality of face areas.

Figure 14:
FIG. 14 is an example of a base image of a group photo.
Figure 15:
FIG. 15 is an example of a (failed) composite image of a group photo.

Accordingly, the difference image also includes a plurality of face areas. As a result, it may occur that the replacement of a face area in an unfavorable condition is accompanied by the erroneous replacement of an adjacent face area (hereinafter, this state is called "interference"). For example, if the base image is a group photo as illustrated in FIG. 14, the face area of the woman at the lower right is large because she was located near the camera position. Accordingly, the base target and the swap target including this face area become so large that it eventually includes the face area of the adjacent man. As a result, the initial contour erroneously includes a plurality of face areas in the difference image. Accordingly, the extracted contour encloses the plurality of face areas. As illustrated in FIG. 15, the replacement of the face area of the woman at the lower right with that of the swap target is accompanied by the erroneous replacement of the face area of the adjacent man.

Figure 16:
FIG. 16 is a view illustrating an example of generated boundaries in a base image.

To avoid such problems, it is preferred to take the following measure for example. First, boundaries are defined between the face areas detected in the base image Specifically, the center coordinate of each face area is calculated, and a boundary at the same distance from each center coordinate of neighboring face areas is generated. If a boundary is located in a face area, the overlapped part is removed and regenerated at a distance of a predetermined number of pixels from the contour of the face area (in the direction away from its center coordinate). In this way, a maximal area for each rectangle including a face area is defined as illustrated in FIG. 16. In the same way as in the base image, a boundary between face areas is also set in the comparative images. Rectangles including a face area are set in the base image and the comparative images such that the size of each rectangle is adjusted so that it does not intersect with the boundaries.

Figure 17:
FIG. 17 is an example of a (successful) composite image of a group photo.

In this way, interference between face areas of the base target or the swap target can be prevented. In the example of a composite image illustrated in FIG. 17, since the area of the base target or the swap target that includes the face area of the woman at the lower right is limited inside the boundary, it does not include the face area of the man on the left. As a result, only the face area of the woman is altered.

Alternatively, the following processing may also be performed in order to solve the above-described problem where an intended subject and a non-intended subject are both altered in the base image. The above-described boundaries are not generated in the base image and the comparative images. Therefore, the base target and the swap target are not prevented from including a plurality of face areas. That is, normal face recognition and the setting of the base target and the swap target, which are exemplified above, are performed. Then, a plurality of face areas in the base target or the swap target may be erroneously changed as a result of the compositing processing. In this case, the user who finds such an erroneous change can tap a face area that he/she wants to restore to that of the base image (in the example of FIG. 15, the face area of the man to the woman's left), and the following compositing processing is performed again.

First, a face area around the tapped area is detected in the previously-defined base target (old base target), and a maximal rectangle is set within the area of the old base target excluding the detected face area (in the example of FIG. 15, the face area of the man next to the woman). This rectangle is set as a base target (referred to as a new base target). Then, a face area is detected around the tapped area in the previously-defined swap target (old swap target), and a maximal rectangle is set within the area of the old swap target excluding the detected face area (e.g. the face area of the man next to the woman). This rectangle is newly set as a swap target (referred to as a new swap target).

The same alignment as step S1013 is performed again on the new base target and the new swap target, and then the compositing processing in step S1020 is performed. As a result, the new swap target, which does not include the selected face area (the face area that the user wants to restore to that of the base image), is composited with the base image. In this way, it is also possible to obtain a desired composite image by means of a user operation without performing the above-described boundary generation processing or the like in the image compositing device. The above-described boundary generation processing requires various exception handlings based on the distance between face areas and the contours of face areas. As this complicates the processing, the boundaries may not be correctly defined in some cases. In such cases, it is possible to restore the selected subject to the condition in the base image by the above-described user operation.

The image compositing device 1 may be configured to be switchable between an automatic recognition mode and a manual recognition mode. If a desired composite image is not obtained in the automatic recognition mode due to incorrectly defined boundaries, the user can switch the mode to the manual recognition mode and tap a subject area that he/she wants to restore to that of the base image. Then, as described above, the swap target that does not include the selected area is newly set, and the image compositing is performed again.

In the above-described embodiment, face areas in the base image are automatically detected, and the base target is set based on the detected face areas. However, the present invention is not limited thereto. An arbitrary area may be specified by the user, and the base target and the swap target may be set based on the specified area to perform the compositing processing. For example, the user may specify a rectangular area by a pinch gesture, the specified area itself may be set as the base target, and the swap target may be also set based on the base target. For example, the comparative images may be scanned with the base target within a predetermined area (around the area corresponding to the base target), and the swap target having the same size as the base target may be set at the position having the highest similarity. In this case, since the area to be composited is more flexible, it is possible to generate a desired composite image that reflects even faint movements of the subjects.

As described above, the image compositing device 10 of this embodiment photographs a plurality of images of the same scene, generates the difference images of a base image with the comparative images in an area where the base image needs to be replaced, estimates the contour of the motion area, and performs an image compositing to replace the base image with a comparative image based on the assumed contour. Therefore, it is possible to generate a natural composite image which correctly reflects subject movement.

(Determination and Display of Replaceability)

After the base image is set in the processing of FIG. 2, which the controller unit 101 of the image compositing device 10 performs, candidate areas in the base image to be replaced (composited) with the comparative images may be set as replaceable areas, and the level of recommendation for replacing each replaceable area (hereinafter referred to as the replaceability) may be displayed in a viewable manner by the user.

In some cases, while most of a plurality of comparative images do not cause any interference of a certain replaceable area with the other replaceable area and can be used for the replacement, some of the comparative images may sometimes be difficult to use for the replacement of the replaceable area due to strenuous movements. In these cases, it is inappropriate to restrict using not only such comparative images but also the other comparative images for the replacement of the replaceable area. To cope with this problem, for example, the replaceability of each replaceable area may be determined based on the degree of overlap between the contours of adjacent replaceable areas, and the determined replaceabilities of the replaceable areas may be displayed in such a manner that the user can recognize them. A low degree of overlap between the contours means a high replaceability (replacement recommended), and a high degree of overlap between the contours means a low replaceability (replacement not recommended).

Figure 18:
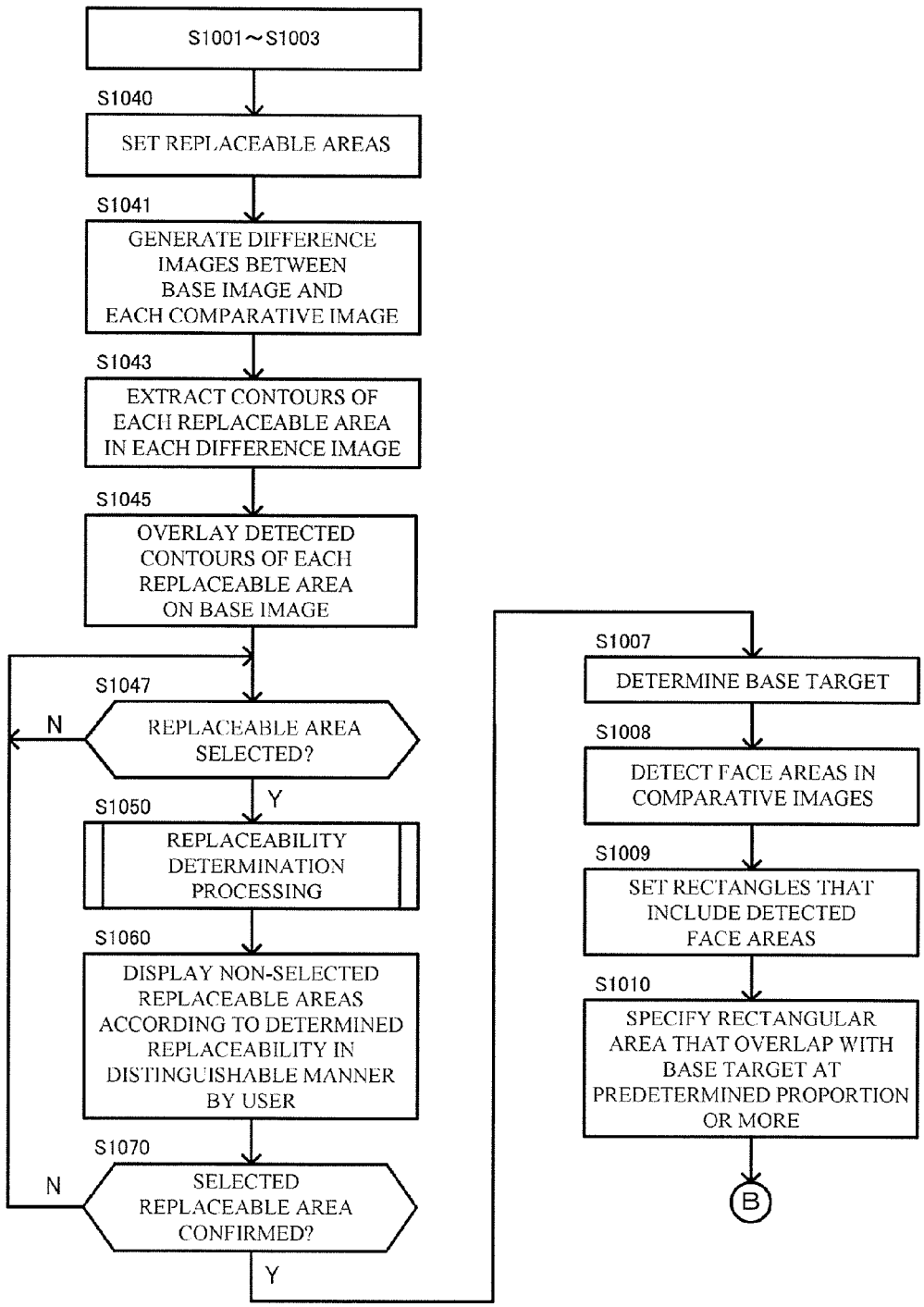
FIG. 18 is a flowchart illustrating a processing performed in an image compositing device.

FIG. 18 is a flowchart illustrating a processing that the controller unit 101 of the image compositing device 10 performs in this case instead of the processing of FIG. 2. The same steps as those in the flowchart of FIG. 2 are indicated by the same reference signs, and the description thereof is omitted.

After the comparative images are aligned with respect to the base image in step S1003, the controller unit 101 sets replaceable areas (S1040). That is, the controller unit 101 serves as a replaceable area setting means. The replaceable areas to be set in this step may be, for example, face areas of the subjects detected by face recognition as with the above-described embodiment or arbitrary areas specified by the user. In this embodiment, the replaceable areas are face areas detected by face recognition. Face recognition may be performed by the same technique as described above, such as recognition using Haar-like features or pattern matching.

Next, the controller unit 101 calculates differences in pixel value between the base image and each of the comparative images, which are the photographed images other than the base image, so as to generate difference images (S1041). As a result, the number of difference images generated corresponds to the number of photographed images other than the base image. Then, the controller unit 101 extracts the contour of each replaceable area (face area) in each difference image (S1043). The controller unit 101 overlays the detected contours of the replaceable areas on the base image (S1045).

Figures 20, 21:
FIG. 20 is a view for describing a method of determining the replaceability and a method of displaying the replaceability.
FIG. 21 is a view illustrating an example of a base image of a group photo on which a contour is overlaid.

FIG. 21 is a view illustrating an example of an image displayed on the display unit 103 in this step. FIG. 21 illustrates the extracted contours that are obtained by setting the photographed image of the group photo of FIG. 15 as the base image and generating the difference images between the base image and each of the other comparative images. In this case, the resulting contours are obtained from three comparative images. The calculation of the difference between the base image and each comparative image gives three difference images. In this case, each face area has three contours respectively from three difference images, which are all illustrated in FIG. 21. As can be seen in the figure, three contours are extracted at each face area of the six persons in the group photo.

Back to FIG. 18, the controller unit 101 makes a determination as to whether the user selects any one of the replaceable areas (S1047). If it is determined that any area is selected (S1047, Yes), the controller unit 101 performs a replaceability determination processing (S1050).

Figure 19:
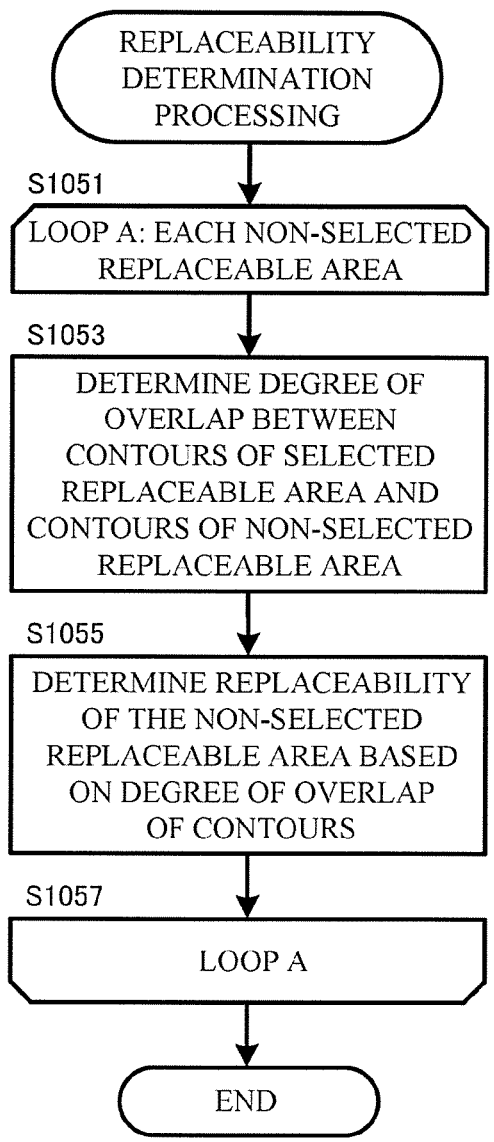
FIG. 19 is a flowchart illustrating a replaceability determining processing.

FIG. 19 is a flowchart illustrating the replaceability determination processing.

The controller unit 101 performs the processing of loop A on each of the replaceable areas other than the selected replaceable area (hereinafter referred to as non-selected replaceable areas) (S1051 through S1057). In the processing of loop A, the controller unit 101 determines the degree of overlap between the contours of the selected replaceable area and the contours of one of the non-selected replaceable areas (S1053). For example, the degree of overlap is determined based on the cumulative total number of the contours of the non-selected replaceable areas extracted from each difference image that intersect with those of the selected replaceable area. The controller unit 101 determines the replaceability of the non-selected replaceable area based on the degree of overlap of the contours determined in step S1053 (S1055).

FIG. 20 is a view for describing the determination method of the replaceability in this step. As illustrated in FIG. 21, three comparative images are used in the replaceability determination method in this example. With respect to the three contours extracted from each replaceable area, the total cumulative number of the non-selected replaceable areas that intersect with the contours of the selected replaceable area is determined.

If the cumulative number of intersecting contours is zero, the replaceability is determined to be "high". If the cumulative number of intersecting contours is from 1 to 3, the replaceability is determined to be "moderate". If the cumulative number of intersecting contours is from 4 to 7, the replaceability is determined to be "caution". If the cumulative number of intersecting contours is 8 or 9, the replaceability is determined to be "not recommended".

Back to FIG. 19, after the replaceability is determined as described above, the controller unit 101 proceeds to process the determination of another non-selected replaceable area. When the processing of steps 1053 through S1055 is complete on all of the non-selected replaceable areas, the controller unit 101 ends the processing of loop A (S1057). Then, the controller unit 101 ends the replaceability determination processing.

Back to FIG. 18, after the replaceability determination processing is completed, the controller unit 101 allows the display unit 103 to display the replaceable areas according to the determined replaceabilities in such a manner that the user can recognize them (S1060). Specifically, as illustrated in FIG. 20 for example, the displayed non-selected replaceable areas are color-coded by semi-transparent different colors according to the replaceabilities. As illustrated in FIG. 20, if the replaceability is "high", the non-selected replaceable area is displayed in semi-transparent "blue". If the replaceability is "moderate", the non-selected replaceable area is displayed in semi-transparent "green". If the replaceability is "caution", the non-selected replaceable area is displayed in semi-transparent "yellow". If the replaceability is "not recommended", the non-selected replaceable area is displayed in semi-transparent "red".

Figure 22:
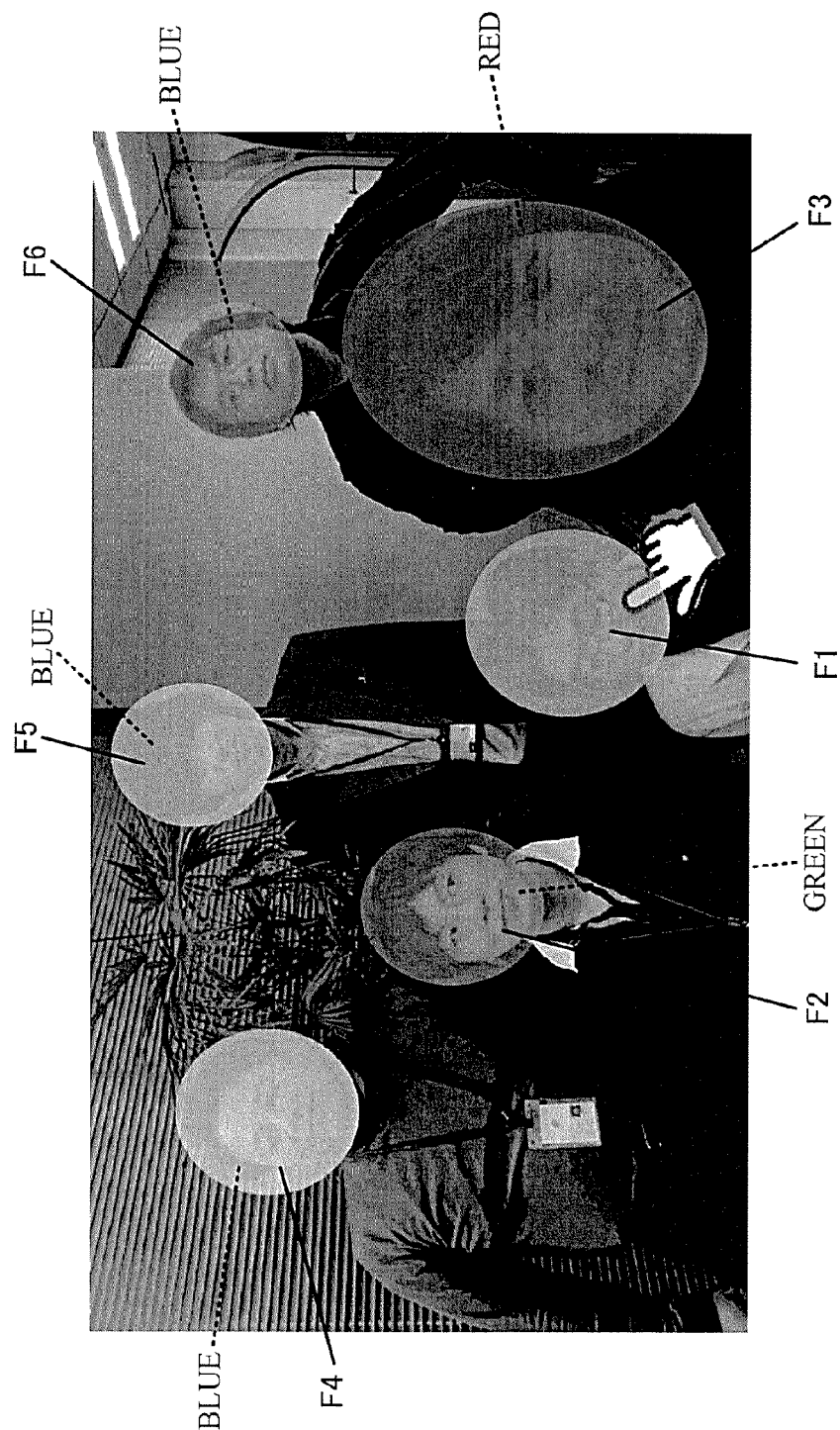
FIG. 22 is a view illustrating an example of a base image of a group photo on which replaceabilities are displayed.

FIG. 22 is a view illustrating an example of the image displayed on the display unit 103 in this step. In this figure, the replaceability is determined in the photographed image of the group photo of FIG. 15, and an example is shown in which the replaceable areas are color-coded by semi-transparent colors according to the replaceabilities.

In this figure, the face area F1 of the man at the lower center of the screen is selected by the user from among the face areas of the six persons detected as the replaceable areas. In this case, the degree of overlap is determined between the contours of the face area F1 and the contours of each of the face areas F2 to F6 of the other five persons based on the extracted contours of the face areas illustrated in FIG. 21, and the replaceability of each of the face areas F2 to F6 is determined based on the determination result.

As a result, since the cumulative number of intersecting contours is 1 between the face area F1 of the man and the face area F2 of a man on the left side of the man, the replaceability of the face area F2 is determined to be "moderate", and the face area F2 is displayed in semi-transparent "green". Since the cumulative number of intersecting contours is 9 between the face area F1 of the man and the face area F3 of a woman on the right side of the man, the replaceability of the face area F3 is determined to be "not recommended", and the face area F3 is displayed in semi-transparent "red". Regarding the face areas F4 to F6 of the three men in the upper area of the screen, since the cumulative number of intersecting contours with those of face area F1 is 0, the replaceabilities of the face areas F4 to F6 are determined to be "high", and the face areas F4 to F6 are displayed in semi-transparent "blue".

Back to FIG. 18, the controller unit 101 determines as to whether the user confirms the selected replaceable area (S1070). If not (S1070, No), the controller unit 101 returns the processing to step S1047. On the contrary, if it is determined that confirmation is made (S1070, Yes), the controller unit 101 proceeds to the processing to step S1007. In step S1007, a rectangle that encloses the confirmed replaceable area (e.g. face area) is set as the base target. The subsequent processing is the same as that of FIG. 2. However, with regard to the processing shown in FIG. 18, the difference images have been already generated (S1041), and the contours of the replaceable areas have been already extracted in each of the difference images (S1043). Therefore, in the compositing processing (S1020), which is performed after steps S1007, the processing of steps S1021 and S1022 may not be performed. In place of the processing of steps S1021 and S1022, the contour of the base image between the set base target and the swap target selected based on the selection operation (S1012) is specified from among the already-extracted contours, and a mask image is generated based on the specified contour (S1023).

If the contours overlap between a certain replaceable area and another replaceable area, there may be interference between the two areas in the overlapped area. In such cases, if the image is replaced in both of the replaceable areas, disturbance of the image may occur in the interference portion (overlapped area between the certain replaceable area and another replaceable area). If that happens, it is required not to replace either one of the two replaceable areas having the interference portion or to accept disturbance of the image if both of the replaceable areas are replaced. However, as described above, since the degree of overlap between the contours of the user-selected replaceable area and those of the other replaceable areas is displayed in a recognizable manner by the user, the user can ascertain the replaceability at a glance. Therefore, he/she can find in advance that replacing a face area having low replaceability is likely to cause disturbance of the image. As a result, he/she can make a decision not to replace such areas.

In the flowchart of FIG. 18, the contours of the replaceable areas, which are extracted from the difference images based on the difference between the base image and the other comparative images, are displayed. However, the contours may not be displayed. The detection of the contours and the determination of the replaceability of each replaceable area may be performed internally, and only the replaceability-based image may be displayed.

It is difficult to replace the replaceable areas whose contours overlap each other due to such mutual interference. To cope with this problem, the device may be configured to permit the replacement in only either one of the replaceable areas whose contours overlap each other instead of permitting the replacement in both of the replaceable areas, and to query the user to select either one of the replaceable areas. Alternatively, the device may be configured to permit the replacement in neither replaceable areas, and to query the user to select a different image as the base image or to encourage the user to photograph the same scene again.

Further, the degree of overlap between the contours of the replaceable area selected by the user (selected replaceable area) and those of the other replaceable areas (non-selected replaceable areas) may be determined, the replaceability of the selected replaceable area may be determined based on the determined degree of overlap, and the reliability of replacement of the selected replaceable area may be displayed. In this case, the degree of overlap may be determined between the contours of the selected replaceable area and those of all the other non-selected replaceable areas, and the replaceability of the selected replaceable area may be determined based on the determined degree of overlap in the same way as illustrated in FIG. 20. Then, according to the determined replaceability, the selected replaceable area may be displayed in a semi-transparent color.

The way of displaying the replaceability is not limited to the above-described way in which the replaceable areas are color-coded by semi-transparent different colors according to their replaceabilities. For example, the contours (e.g. the innermost contours of the contours obtained from the difference images) of the replaceable areas may be color-coded in different colors according to the replaceability. Furthermore, the replaceable areas may be marked with different signs (e.g. A (replaceable), B (caution) and C (not recommended)) according to the replaceability, or the replaceable areas may be painted with different hatches or patterns according to the replaceability.

Instead of determining the replaceability based on the degree of overlap of the contours, the replaceability may be determined based on the part of a contour area (an area enclosed by a contour) that also belongs to another contour area (i.e. overlapped part between the contour areas). For example, if the proportion of the overlapped part in a contour area is low, the replaceability may be determined to be high. If the proportion of the overlapped part in a contour area is high, the replaceability may be determined to be low.

(Setting of Replaceable Area)

In the above-described embodiment, the replaceable areas are areas defined by the contours of the face areas that are automatically detected by face recognition in the base image. However, the method of setting the replaceable areas is not limited thereto.

Specifically, the replaceable area may be set by using an energy function whose parameter is the distance from the subject to be replaced in the base image (e.g. the distance from the center coordinate of a subject to be replaced in the base image) or the pixel value of the difference image between the base image and the comparative image.

An exemplary energy function whose parameter is the distance from the subject to be replaced will be described.

This energy function is represented by, for example, the following equation.

[Expression 4]

$$E(v) = \sum_p C(p, V_p) + \sum_q P_1 T[|V_p - V_q| \le \theta] + \sum_q P_2 T[|V_p - V_q| > \theta] \quad (4)$$

Where "v" is the above-described closed curve on a pixel plane, and E(v) is the energy of the closed curve v. "p" and "q" are the distances from the center coordinate of the subject respectively (hereinafter referred to as the "center distances"). "$V_p$" is the pixel value of the set of pixels at the center distance p in the base image, and "$V_q$" is the pixel value of the set of pixels at the center distance q in the base image. As used herein, a pixel value is, for example, the pixel value average of all pixels located at a same center distance. Instead of average, a pixel value may be the median, the maximum, the minimum or the like of the pixel values of all pixels located at a same center distance.

$C(p, V_p)$ is the cost value of $V_p$ at a center distance of p, which is calculated as the inverse of the edge intensity of $V_p$. That is, the higher the edge intensity is, the lower the cost value $C(p, V_p)$ is. T[ ] is a function that has "1" if the condition in the square bracket is satisfied, and has "0" if the condition is not satisfied. "P" is a penalty value that is determined based on the difference between $V_p$ and $V_q$, where "$P_1$" is the first penalty value that is imposed if the difference of pixel value is at or lower than a predetermined threshold θ, "$P_2$" is the second penalty value that is imposed if the difference of pixel value is more than the threshold θ. $P_1$ and $P_2$ satisfy "$P_1 < P_2$", and the higher the difference of pixel value is, the larger the imposed penalty value is.

The energy function of expression (4) is formulated in order to select the closed curve that encloses as large an edge as possible in the base image and has as small a difference in pixel value between sets of pixels at different center distances as possible. That is, higher edge intensity of $V_p$ gives lower cost value, and smaller difference between $V_p$ and $V_q$, gives lower imposed penalty, and accordingly they give lower energy E(v). A closed curve v that gives the lowest energy E(v) is computed by means of optimal solution computing of the energy function, and the area enclosed by the obtained optimal closed curve v is set as a replaceable area.

Alternatively, the sign of each term in the energy function of expression (4) may be reversed (to be a minus sign), and a closed curve v that gives this maximal energy function E (v) is computed by means of optimal solution computing, so as to set the replaceable areas.

If the pixel value of the difference image between the base image and the comparative images is used as a factor, it is possible to define a similar function to the function of expression (4), and optimal solution computing is performed to determine an optimal solution of the optimal closed curve v that encloses an edges with strong intensity in the base image and has small difference in pixel values between sets of pixels in the difference image, so as to set the replaceable areas.

Further, an area specified by the user may be set as the replaceable area. Specifically, for example, the device may be configured such that the user can paint an arbitrary area in the base image by a drag gesture, and the area painted by a finger or a slightly larger area than the painted area may be set as the replaceable area. In this case, as illustrated in FIG. 18, the difference images between the base image and the comparative images are generated (S1041), and the contours are extracted from each difference image (S1043). However, if differences between the base image and the comparative images are minor, it may cause no contour to be detected. In this case, the replaceable area may be enlarged by a predetermined magnification (e.g. from 2 to 4 times), and the contours may be extracted again in the magnified replaceable area. In this step, if no contour is extracted even at a predetermined upper limit magnification (e.g. 4 times), it may be informed to the user that the replacement is infeasible or unnecessary.

If the base images include few edges or if the images are mostly flat, it may be informed to the user that the replacement is unnecessary because the replacement can be assumed to be unnecessary in such cases. On the contrary, if the difference images include a number of edges, it may be informed to the user that the replacement is infeasible because it is difficult to correctly replace only the desired area in such cases. The unnecessity/infeasibility of the replacement may be informed to the user, for example, by displaying the replaceable area in "purple" if the replacement is unnecessary, and displaying the replaceable area in "red" if the replacement is infeasible.

Specifically, for example, the following processing is performed. The average of the pixel values (pixel average) of all pixels in the replaceable area in the difference images is calculated. Then, if the pixel average is lower than a first threshold (e.g. 10, if the maximum is 255), it is determined that the replacement is unnecessary in the replaceable area, which is informed to the user. If the pixel average is higher than a second threshold (e.g. 100, if the maximum is 255), it is determined that the replacement is infeasible in the replaceable area, which is informed to the user.

Figure 23:
FIG. 23 is a view illustrating an example of a replaceable area by means of a user operation.

FIG. 23 is an example of the base image in this case. Also in this figure, the photographed image of the group photo of FIG. 15 is used as the base image. In order to set the image area of the name card of the man on the left in the base image of FIG. 23 as a target for the replacement, the user performs a drag gesture on the touch panel so as to paint the image area of the name card using a finger. In this step, an area R2, which is slightly larger than the area R1 painted by the user's finger, is set as the replaceable area R2, and the contours are extracted from the difference images between the base image and the comparative images in the replaceable area R2. If a contour is extracted, the areas in the other comparative images that correspond to the replaceable area R2 are displayed so that candidate images for the replacement are displayed. If no contour is extracted, the average of the pixel values (pixel average) of all pixels in the area of the difference image that corresponds to the replaceable area R2 is calculated. If the pixel average is lower than the first threshold, it is determined that the replacement is unnecessary in the replaceable area R2, which is informed to the user. If the pixel average is higher than the second threshold, it is determined that the replacement is infeasible in the replaceable area R2, which is informed to the user.

(Detection of Face Area)

In the above-described embodiment, a rectangular area that includes a face area that the user wants to replace is selected as the base target from among the face areas detected in the photographed images, and the replacement is performed in the base target. In this case, the user who wants to replace the face areas of a plurality of persons has to set the base target for each face area. If the face areas of a plurality of persons are replaced, it is desirable that all of the face areas to be replaced are replaced with those in the best condition. However, it is sometimes difficult due to interference between the face areas.

To cope with this problem, a photographed image in which any one of the face areas (hereinafter referred to as an "active face area") is photographed in the most desirable condition is selected as a comparative image. If the active face area interferes with at least one of the other face areas (hereinafter referred to as the "inactive face areas") in the selected comparative image, this selected comparative image is set as the comparative image with which the active face area is replaced (composited). Furthermore, the controller unit 101 automatically selects another comparative image in which no interference occurs and the inactive face areas are photographed in the most desirable condition from among the remaining comparative images other than the selected comparative image (for example, by making a determination based on the front level and the smile level (described below)), and sets it as the comparative image with which the inactive face areas are replaced (composited).

Further, the device may be configured such that if another comparative image in which the inactive face areas are photographed in the most desirable condition is automatically selected from the remaining comparative images other than the selected comparative image but the user does not prefer this automatically selected comparative image, the user can manually select a different comparative image in which no interference occurs and the user thinks the inactive face areas are photographed in the most desirable condition.

Further, the comparative image with which the face areas are replaced may be automatically selected based on the characteristic score of the faces included in the detected face areas (hereinafter referred to as the "face characteristic score"). Specifically, the face characteristic score may be calculated with respect to each face area of each comparative image, and a combination of the comparative images which gives the highest total of the points based on the characteristics score may be set as the combination of the comparative images for the replacement. Such face characteristic scores include the front level, which represents how much a face is directed to the front, the smile level, which represent how much a face smiles, and the like. Such face characteristic scores can be detected by techniques known in the art, and the detailed description of the method is omitted.

Figure 24:
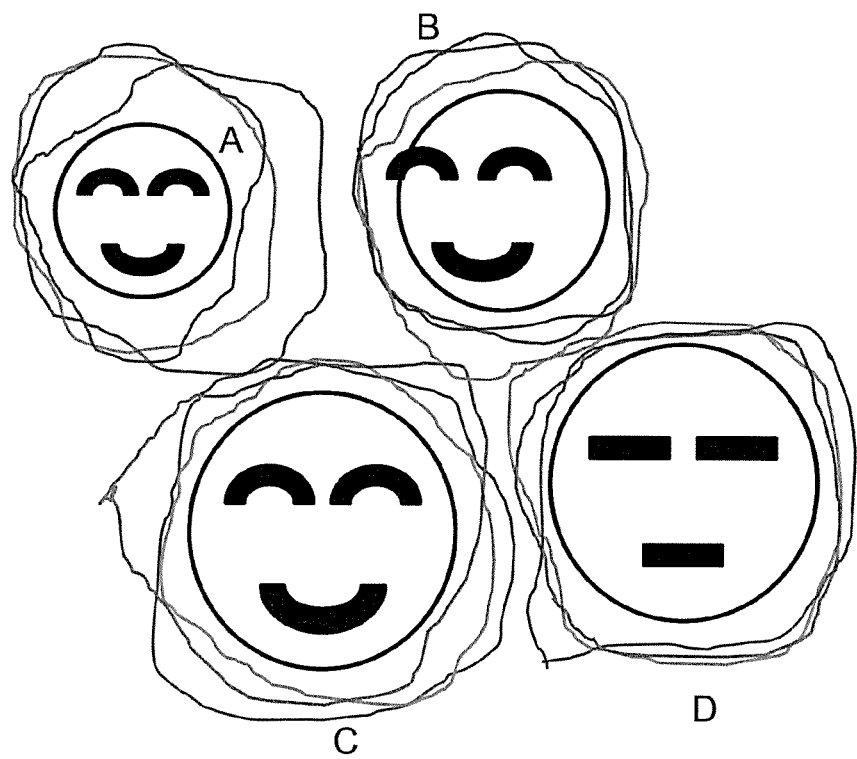
FIG. 24 is a schematic view of the faces of people included in a photographed image and the contours thereof.
Figure 25:
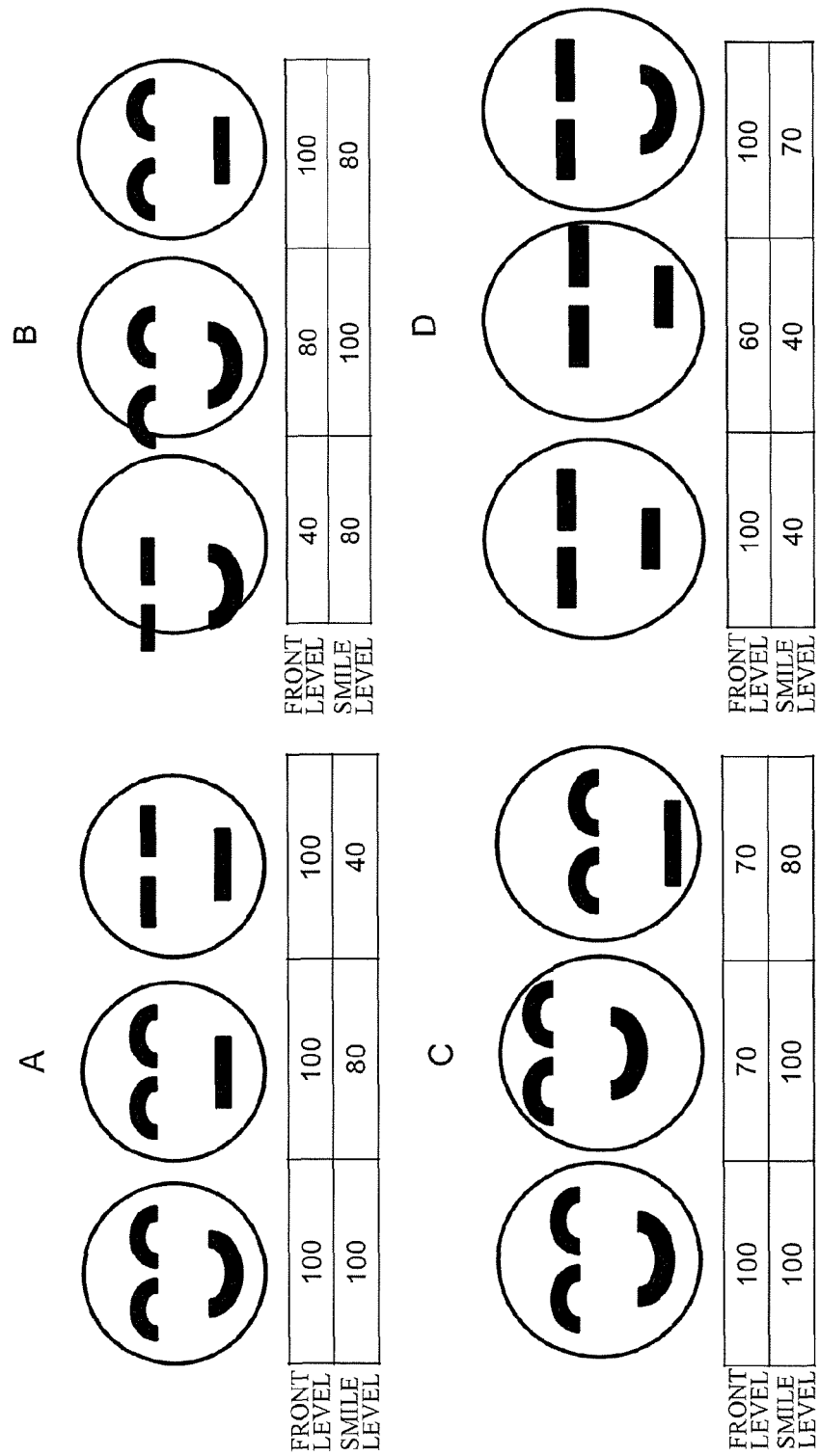
FIG. 25 is a view illustrating an example of quantification of face characteristic scores.

For example, as illustrated in FIG. 24, four persons A to D are included in the photographed images. These persons are named as A to D for descriptive reasons. Three images are photographed as the comparative images. The result of detecting face areas in each of the three comparative images and then quantifying the face characteristic scores of the four persons A to D is illustrated in FIG. 25. FIG. 25 illustrates the simplified faces of the four persons A to D in each of the three comparative images. Under each face, the FIG. 25 also illustrates the front level and the smile level as the face characteristic score, which are quantified into values ranging from 0 to 100. A higher value of the front level represents that a face is more directed to the front, and a higher value of the smile level represents that a face smiles more.

For example, with respect to each of persons A to D, the sum of the front level and the smile level is calculated to obtain the face score s (s=front level+smile level). Then, a combination of the comparative images that gives the highest value of the total score S, which is the sum of the face scores of each person, is set as the combination of the comparative images that is used for replacing the faces.

Instead of the sum of the front level and the smile level as described above, the face score s may be composed only of the front level (s=front level) or may be composed only of the smile level (s=smile level). Furthermore, the face score s may be a weighted average of the front level and the smile level. That is, the face score s may be calculated based on the equation "s=α×front level+β×smile level". Where "α" and "β" are the weights of the front level and the smile level respectively, and "α+β=1". Weights "α" and "β" may be, for example, configurable by the user. That is, if the user wants to put weight on the front level in replacing the face areas, he/she can set weight "α" higher than weight "β". If the user wants to put weight on the smile level in replacing the face areas, he/she can set weight "β" higher than weight "α".

Alternatively, the importance level may be set to each face of the photographed persons, and a weight average of the face scores s may be obtained based on the importance level. For example, if the comparative images include the four persons A to D as described above, the total score S may be calculated based on the equation "S=a×As+b×Bs+c×Cs+d×Ds", where As, Bs, Cs and Ds are the face scores of the persons A to D respectively, and "a" to "d" are the importance levels of persons A to D respectively. Then, a combination of the comparative images that gives the highest value of the total score S thus calculated may be set as the combination of the comparative images that is used for replacing the face areas.

The importance level of each person may be configurable by the user or may be automatically set. If the importance level is automatically set, for example, it may be configured to increase as the detected area of a face area increases. Further, for calculating the total score S, the user may set in advance the importance level of a person who is to be the subject. Among the face areas in the comparative images as a result of the face recognition, a face area with a previously-set importance level is set to have this important level, and a face area without any previously-set importance level is set to have an importance level lower than the importance level previously set by the user.

Further, the device may be configured such that the user can select an arbitrary person from a displayed plurality of faces of persons, and he/she can further select a face of the selected person from a plurality of face candidates. In this case, regarding the remaining persons other than the selected person, the combination of the faces of the remaining persons may be determined based on the total score S in consideration of the interference with the face areas of the remaining persons that may be caused by the user selecting the face of the selected person and the interference that may occur between the face areas of the remaining persons. For example, among the faces of the plurality of persons A to D illustrated in FIG. 24, the user selects the faces of persons B and D, and further selects the second face and the third face in FIG. 25 respectively. In this case, regarding the remaining persons A and C, a first interference with the face areas of the remaining persons A and C that may be caused by the user selecting the second face and the third face of the selected persons B and D respectively is taken into consideration. Furthermore, a second interference that may occur between the face areas of the remaining persons A and C is also taken into consideration. Then, the faces of the remaining persons A and C may be determined based on the total score S by applying a first condition that neither first nor second interference occurs between the remaining persons (A and C) and between any one of the remaining persons and any one of the selected persons (B and D), and a second condition that the second face and the third face are selected for the selected persons B and D, respectively.

Further, the device may be configured such that if the comparative images include the face of an unintended person, the user can exclude the face, and the total score is calculated excluding the face excluded by the user.

In addition to the above-described front level and smile level, the characteristic score may also be based on other characteristics such as red-eye level, closed-eye level and front level of line of sight.

Second Embodiment

In this embodiment, a subject area of one or more comparative image that are photographed before or after the base image are sequentially inserted into a predetermined subject area of a base image so as to generate successive images. If the subject moves, the generated successive images give an impression as if a movement occurs in the subject area (only the subject area is composed of a motion picture) in the still base image. In the following, an image compositing device, an image compositing method and a program according to the second embodiment will be described. Since the image compositing device of this embodiment has the same configuration as the image compositing device 10 of the first embodiment, the description thereof is omitted, and the same reference signs are used in the following description.

If a motion area in the image is automatically determined by an image analysis of the base image and the comparative image, an area including a faint movement (e.g. moving leaves) in the background of the subject to be the motion area may be sometimes erroneously extracted as the motion area although it is not intended to be judged as the motion area. Further, the motion area may be excessively extracted due to a change of overall brightness during the photographing, which is caused by a compensation function of a camera, a change of a light source or the like. In the following embodiment, these problems can be solved, and the motion area can be correctly extracted by an image analysis of the base image and the comparative image.

Figure 26:
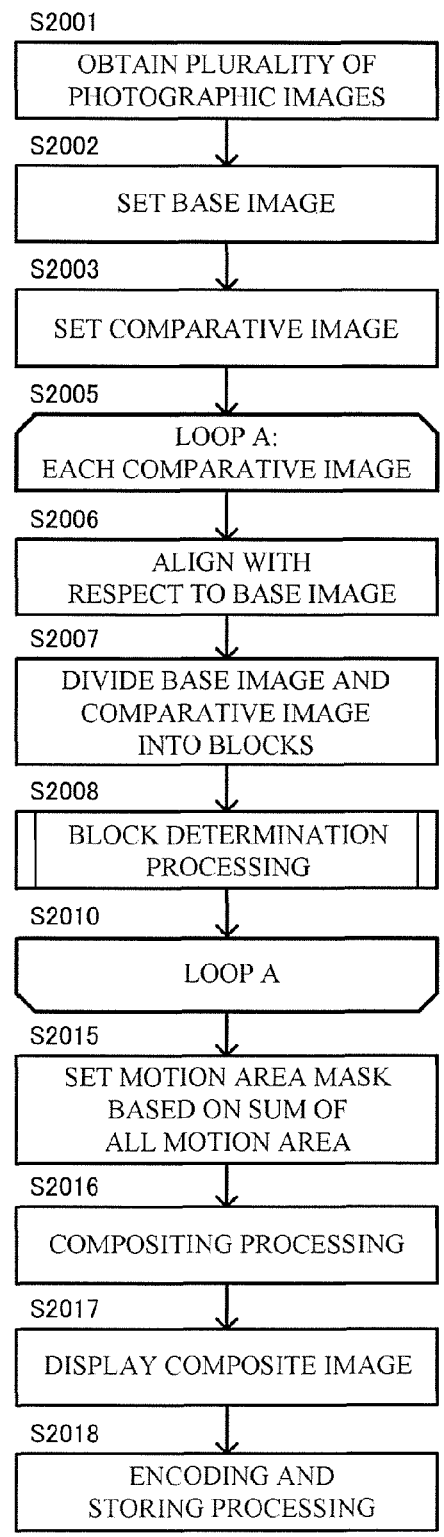
FIG. 26 is a flowchart illustrating a processing performed in an image compositing device.
Figure 27:
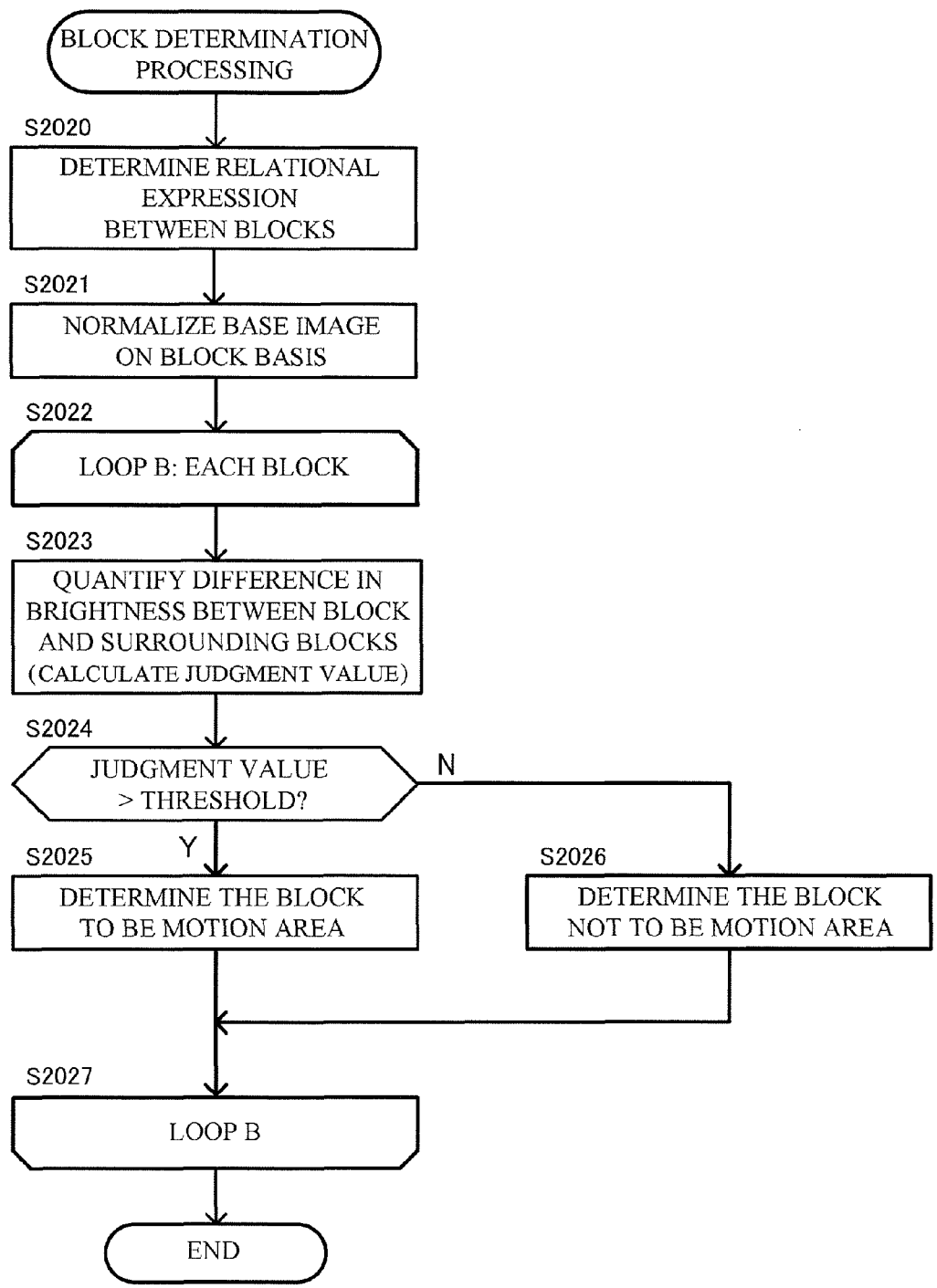
FIG. 27 is a flowchart illustrating a block determination processing.

Hereinafter, a processing performed in the image compositing device 10 according to the second embodiment will be described with reference to the flowchart of FIGS. 26 and 27. An image compositing program, which is a part or all of the processing of FIGS. 26 and 27, is loaded into a memory and is performed by a CPU of a controller unit 101.

First, in the image compositing device 10, a user operates the imaging unit 105 by performing a predetermined photographing operation such as tap gesture on a "photograph" button displayed on the display unit 103, so as to photograph a subject multiple times to obtain the corresponding number of photographed images (S2001). By using the above-described serial photographing mode for example, a plurality of photographed images can be obtained by a single photographing operation.

The plurality of photographed images thus obtained are stored in a memory unit 102. Then, a base image is chosen from among the photographed images (S2002). The base image may be set, for example, by automatically choosing the first photographed image or by displaying the plurality of photographed images on the display unit 103 to query the user to select an image as the base image.

After setting the base image, the comparative image is set. For example, one or more images are set as the comparative image from among a series of the images photographed in the serial photographing mode form which the base image is selected (S2003). The comparative image, which is material of a compositing processing (described below), may be arranged in the order of photograph time or may be arranged in a user-selected order. On each comparative image thus selected, a processing of steps S2005 through S2010 (described below) is performed.

The controller unit 101 performs the processing of loop A (steps S2005 through S2010) on each comparative image that is set in step S2003. First, in the processing of loop A (S2005 or later), the controller unit 101 performs an alignment of a comparative image with respect to the base image to cope with the existing misalignment between the base image and the comparative image due to camera shake or the like (S2006). In this embodiment, the alignment is performed by block matching. Other alignment techniques such as gradient method may be used instead.

Figure 28:
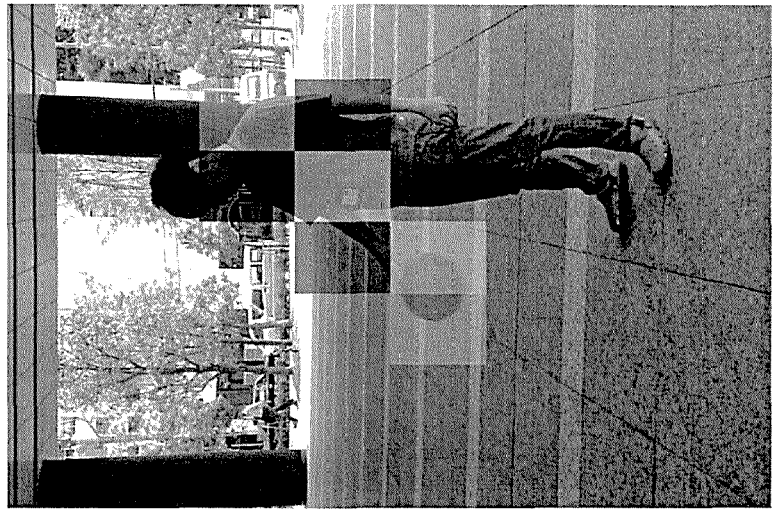
FIG. 28 are views illustrating an example of base images before and after normalization.
Figure 28:

Next, the base image and the comparative image with a motion area of the subject that is to be determined are each divided into blocks of a common size (S2007). The size of the blocks depends on the required size of movement to be captured. In order that a movement in the background of the subject (e.g. movement of the leaves behind the subject in the example of FIG. 28) and the like is not reflected in the composite image, if the images are photographed at a resolution of VGA (640×480) for example, a preferred block size is roughly 16×16 pixels or 32×32 pixels.

The size of the blocks may be variable according to one or more factors selected from the photographic conditions such as depth of focus obtained from the imaging device, the features of the photographed images such as proportion of the area in which a predetermined edge (brightness difference) is detected (i.e. proportion of the area which is likely to be determined to be the motion area) in the difference image between the base image and the comparative image, and a user input (e.g. the block size may be variable according to a pinch gesture by the user to enlarge/reduce a rectangle). By the variable block size, for example, an area with a faint movement can be correctly determined to be the motion area in photographed images that, as a whole, contain little movement (includes the motion area at a low proportion). Furthermore, in photographed images that include many moving subjects and that, as a whole, contain a lot of movement (includes the motion area at a high proportion), only an area with a large movement can be correctly determined to be the motion area. In this way, it is possible to generate a composite image in which the motion area is correctly determined based on any one of the photographic conditions, the features of the photographed images and a user input.

After the division into blocks, the controller unit 101 performs a block determination processing of step S2008. FIG. 27 illustrates a flowchart of the block determination processing. First, in the block determination processing, coefficients $\alpha_i$ and $\beta_i$ that satisfy the following expression are determined with respect to each pair of corresponding blocks of the base image and the comparative image (i=1, 2, . . . n=total number of the blocks) by an approximation (fitting) technique such as least-square method (S2020).

[Expression 5]

$$y_{input} = \alpha_i \cdot y_{src} \cdot \beta_i \qquad (5)$$

Where, $y_{src}$ is the set of the brightness values of block i in the base image, $y_{input}$ is the set of the brightness values of block i in the comparative image. By using the calculated $\alpha_i$ and $\beta_i$, set $y_{norm}$, which is normalized $y_{src}$, is determined according to the following expression (S2021).

[Expression 6]

$$y_{norm} = \alpha_i \cdot y_{src} + \beta_i \qquad (6)$$

$y_{norm}$ obtained from the above expression has the following characteristics. The influence of a possible change of exposure or the like is eliminated as a result of normalization because such changes uniformly affect the overall image. Therefore, if there is no subject movement between the base image and the comparative image, there is no difference (or the difference, if any, is comparatively small) in brightness between the normalized blocks. That is, only a movement that crosses over the blocks affects their coefficients $\alpha_i$ and $\beta_i$, which results in a comparatively large difference in brightness between the blocks with the movement and the other blocks.

For example, if the above-described block division and normalization of each block are performed on the base image of FIG. 28(a), a difference in brightness occurs between the blocks including a subject motion area and the surrounding blocks as illustrated in FIG. 28(b). The blocks including moving subjects, i.e. the ball and the arm and upper body of the subject, have a brightness largely different from the brightness of the surrounding blocks where no subject moves. In this way, the motion area of the subject can be estimated from the difference in brightness between the blocks including the motion area of the subject and the surrounding blocks.

After the normalization of the base image on a block basis in step S2021, the controller unit 101 performs a processing of loop B on each of the normalized blocks (S2022 through S2027). First, in the processing of loop B (step S2022 or later), the difference in brightness at the boundary between a block and its adjacent blocks is quantified in order to make a determination as to whether the block includes the motion area of the subject (S2023). Specifically, with respect to each of the pixels of the block to be determined that are located at the boundary with the adjacent blocks (if the block size is 32×32 pixels for example, there are 32×4=128 pixels), the absolute value of the difference between the brightness of an object pixel and the brightness of a pixel of the adjacent block adjacent to the object pixel is calculated. Then, the sum of the calculated values of all object pixels is determined as a judgment value. If there is no movement that crosses over blocks and there is therefore no difference in brightness, the judgment value is close to 0. If there is a movement that crosses over blocks, in particular a subject that occupies a large proportion of the block moves, the judgment value is large. Therefore, the determination of whether the block includes the motion area of the subject can be made by setting a threshold and comparing the judgment value with the threshold (S2024).

If the judgment value is higher than the threshold (S2024, Yes), the block is determined to be a motion area, which includes a moving part of the subject (S2025). If the judgment value is at or lower than the threshold (S2024, No), the block is determined not to be a motion area (S2026). The steps S2023 through S2025 or S2026 are repeated until all of the blocks are determined. After all of the blocks are determined, the controller unit 101 ends the processing of loop B (S2027). Then, the controller unit 101 returns the process to the processing of loop A in FIG. 26, and repeats steps S2006 through step S2008 (block determination processing) on another comparative image. After the determination on all of the selected comparative images is completed, the controller unit 101 ends the processing of loop A (S2010). When the processing of loop A ends, the motion area in each pair of the base image and the comparative image has been determined.

Figure 29:
FIG. 29 is a view illustrating an example of an image on which the sum of motion areas is overlaid.

Then, the controller unit 101 determines the sum (OR, logical add) of the determined motion areas of the pair of the base image and each comparative image, and sets it as a motion area mask (S2015). FIG. 29 illustrates an example of the sum (OR area) of the motion areas determined based on the pair of the base image and each comparative image, which is overlaid on the base image.

Figure 30:
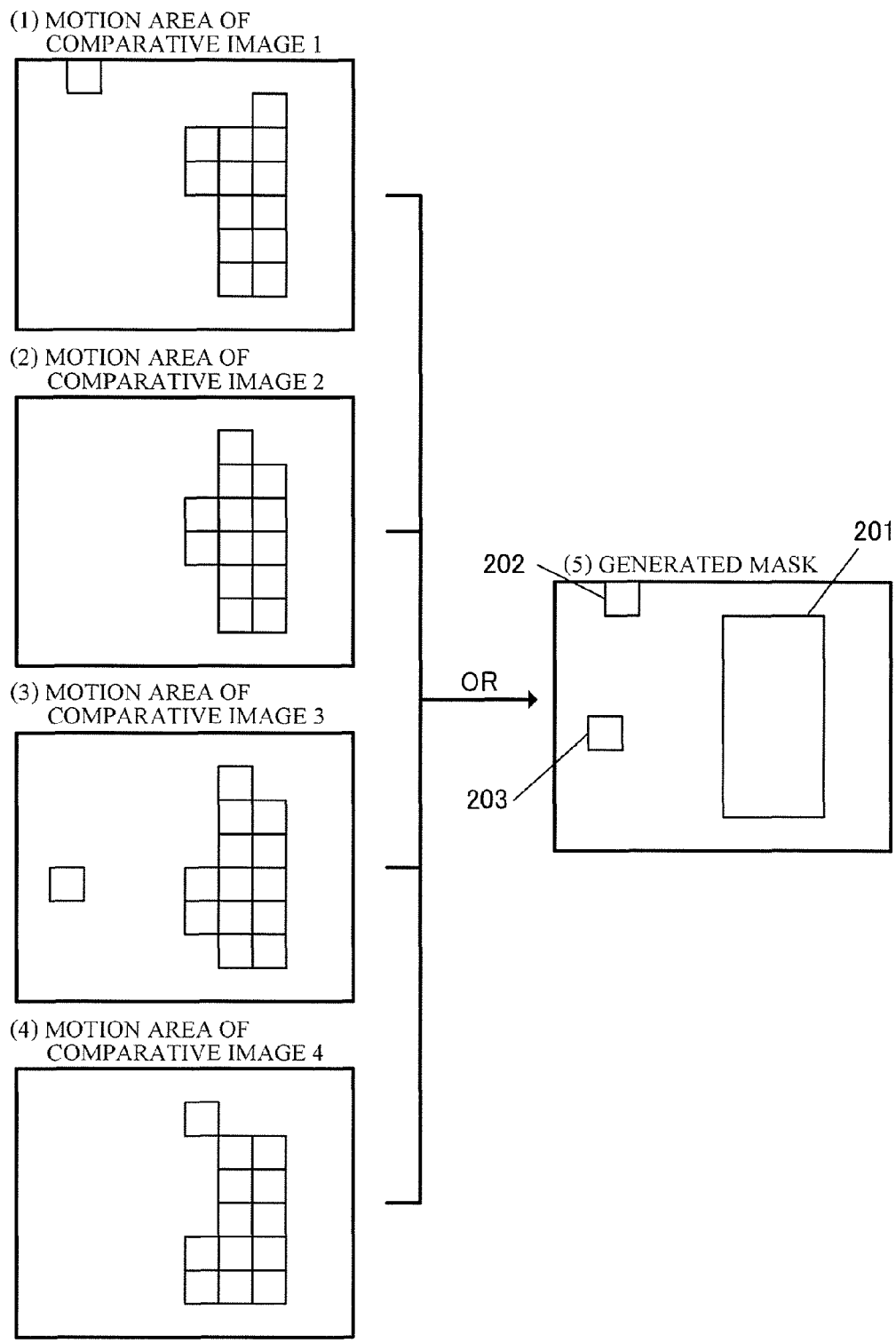
FIG. 30 is a view illustrating an example of a mask that is generated based on the sum of motion areas.

An example of the processing of step S2015 will be described with reference to FIG. 30. Comparative images 1 to 4 are selected as the comparative image in this example. Accordingly, four motion areas: (1) a motion area that is determined based on the relation between the base image and comparative image 1; (2) a motion area that is determined based on the relation between the base image and comparative image 2; (3) a motion area that is determined based on the relation between the base image and comparative image 3; and (4) a motion area that is determined based on the relation between the base image and comparative image 4 are obtained as a result of the processing of loop A (S2005 through S2010). Then, (5) a motion area mask corresponding to the sum (OR area) of the motion areas is generated. This motion area mask is composed of areas respectively corresponding to motion areas 201 to 203.

Then, using the set motion area mask, a compositing processing is sequentially performed to composite the base image with the selected comparative image (S2016). A series of composite images obtained by the compositing processing are sequentially displayed on the display unit 103 (S2017). In this way, in the base image, the area that is determined not to be a motion area based on the relationship with any comparative image (e.g. an area other than motion areas 201 to 203) remains the base image (still image), while the area that is determined to be a motion area based on the relationship with at least one of the comparative images (e.g. motion areas 201 to 203) is sequentially composited with the corresponding area of the selected comparative image, which gives a user an impression as if the composite area were composed of a motion picture.

If the user thinks that the obtained series of composite images are appropriate, he/she taps a "confirm" button displayed on the display unit 103, and the image data for generating a composite image (the base image, the motion mask and the selected comparative image) are coded into a certain image format such as GIF and is stored in the memory unit 102 (S2018).

Step S2017 of displaying a preview for the user confirmation may not be performed, and the image data reflecting the motion area mask may be coded and stored in the memory unit 102 immediately after the motion area mask is set.

(Features of Second Embodiment)

In the detection of the motion area according to this embodiment, it is required that a large movement over blocks is detected with high sensitivity while a faint movement over blocks is detected with low sensitivity. This is because it is preferred that an area with a faint movement that the user cannot recognize is determined not to be the motion area. Rather, it is required that an area with a movement that the user can clearly recognize is correctly determined to be the motion area so as to reflect the movement to the resulting image.

Other than the technique used in this embodiment, it would also be possible to use a technique of simply calculating the pixel difference value on a pixel basis and detecting the motion area based on the calculated pixel difference values. While this technique can detect a large movement with high sensitivity, it is also sensitive to a faint movement. Therefore, it does not satisfy the conditions required for the above-described detection of the motion area.

Further, it would also be possible to use a technique of calculating the average pixel value of the pixels included in each divided block and detecting the motion area based on the difference in average pixel value between blocks. This technique is not sensitive to the detection of a faint movement because each block is averaged. However, it may not be possible to detect a large movement within a block at high sensitivity because the whole block is equalized by the averaging. Therefore, this technique does not satisfy the conditions required for the above-described detection of the motion area.

However, in the technique of this embodiment, if there is no movement or a faint movement of the subject within a block, the influence thereof is eliminated by normalization, which results in no or little difference in brightness between normalized blocks. Therefore, this technique is not sensitive to a faint movement of a subject. In contrast, if there is a large movement of the subject, it results in a large difference in brightness between normalized blocks. Therefore, by detecting the difference in brightness between blocks, an area where the subject moves (motion area) can be detected with high sensitivity. Brightness is one of the characteristic values of an image, and a movement of a subject is significantly reflected to change of brightness. Therefore, the detection of the motion area based on brightness has high availability.

(Motion Area Determination)

In the above-described second embodiment, the device may be configured such that if the subject is not animated smoothly in the series of composite images, the user can select a further comparative image, and the processings of steps S2005 through S2010, and steps S2015 and S2016 is performed on the newly selected comparative image to increase the number of composite images. This can complement the animation of the subject to make it smoother.

When displaying the composite images, the area that is determined to be the motion area may be overlaid on the composite images as illustrated in FIG. 29. The motion area may be configured to be changeable by a touch or pinch gesture of expanding or reducing the overlaid area if the user wants to expand or reduce the motion area, and the comparative image may be composited within the changed overlaid area. Further, for generating a new motion area, another overlaid area may be newly generated based on a touch or pinch gesture, and the comparative image may be composited within the new overlaid area.

In step S2020 of the above-described embodiment, where a relational expression between blocks is determined, it is assumed that the relation between the base image blocks and the comparative image blocks can be represented by a linear function, and each block is normalized by determining the coefficient and constant. However, the present invention is not limited thereto, and the relation between the blocks may be defined by any function. For example, a coefficient and a constant of a quadratic function may be determined, or a correlation coefficient may be determined in each block, and these values may be compared. Further, in the least-square approximation, it may be determined that there is a moving subject if the residual is large.

In the above-described embodiment, differences in brightness between adjacent pixels across a block boundary are calculated, and the sum of the differences is used as the judgment value. However, the present invention is not limited thereto, and the judgment value may be any value that can be used for making a determination as to whether a block is a motion area. For example, a coefficient or a constant of a relational expression between the base image blocks and the comparative image blocks may be used as the judgment value.

If a certain block (referred to as a center block) is determined to be the motion area in step S2025, the blocks adjacent to this block (referred to as adjacent blocks) are also likely to be the motion area. Therefore, in order to determine the adjacent blocks to be motion areas as much as possible, i.e. in order to decrease the probability of erroneously determining them not to be the motion area although they are in fact the motion area of the subject, it is preferred to set the threshold of step S2024 to a lower value when determining the adjacent blocks than when determining the center block. Further, even if one of the adjacent blocks is determined not to be the motion area, it is preferred to re-determine it (one adjacent block) to be the motion area if all of the other (three) adjacent blocks are determined to be the motion area. This can prevent an isolated and discontinuous motion area that may cause a non-smooth composite image.

The center block may be automatically selected based on the determination of the motion area. However, the device may be configured such that the user can specify the center block. Specifically, the device may be configured to receive a user input specifying a block, and the block specified by the user (hereinafter referred to as the specified block) may be set as the center block. Then, a determination may be made as to whether the adjacent blocks of the center block are the motion area by performing the above-described determination by the threshold.

Since the specified block does not always include a movement, a confirmatory determination may be made as to whether the specified block is the motion area by quantifying the difference in brightness between the specified block and the surrounding blocks to calculate the judgment value in the step S2023 and making the determination by the threshold on the judgment value. In this step, the block specified by the user (and the surrounding blocks) may be determined using a lower threshold than in determining the other non-specified blocks so that it is (they are) more likely to be determined to be the motion area.

As a result of the above-described determination by the threshold on the adjacent blocks, if an adjacent block is determined to be the motion area, the adjacent block may be set as a center block. Then, a determination may be made recursively as to whether the adjacent blocks of this block are the motion area by calculating the judgment values of the adjacent blocks similarly and determining the calculated judgment values by the threshold. This processing can expand the motion area so as to automatically set a single motion area that is composed of serial blocks (that are determined to be the motion area).

In the above-described embodiment, the motion area is composed of a combination of rectangular blocks. This may cause an unnatural composite image such as discontinuity at the boundary between the blocks determined to be the motion area and the blocks determined not to be the motion area. To cope with this problem, an image processing may be performed on the boundary between the blocks determined to be the motion area and the blocks determined not to be the motion area so as to deform it into a non-linear shape or to blur it by a filter.

Further, the motion area may be dynamically changed according to a user operation as described above. In this case, an unintended small motion area may be generated due to an operation error or the like. In order to prevent this, if a motion area is not larger than a predetermined area (e.g. one block), such motion areas may be determined not to be the motion area. Similarly, if an area that is determined not to be the motion area is not larger than a predetermined area, it may be determined to be the motion area.

Further, in the above-described embodiment, the base image and the comparative image are divided into blocks (judgment areas) of a common size, the relation of brightness represented by expressions (5) and (6) are defined as the image characteristic value between corresponding blocks, and the motion area of the subject is detected based on this relation of brightness. However, the characteristic value that can be used for detecting the motion area is not limited to brightness. For example, the relation of characteristic values such as color intensity, lightness and color difference may be defined similarly, and the motion area of the subject may be detected based on the relation of these characteristic values.

Since brightness significantly reflects a change of the scene in the photographed images, it is preferred to use the brightness as the characteristic value. However, other characteristic values such as color intensity, lightness and color difference also reflect a change of the scene as well as brightness. Accordingly, their relations may be defined as with the above-described relation of brightness (expressions (5) and (6)), and the motion area may be detected based on the defined relations. In these cases, the same technique as used for brightness may be used to detect the motion area on a block (judgment area) basis.

In these cases, one of the characteristic values such as color intensity, lightness and color difference may be solely used to detect the movement of the subject. However, since the pattern of color intensity, lightness and color difference in an image changes less than the pattern of brightness, it may be difficult to detect the movement of the subject. To cope with this problem, the movement of the subject may be detected by using brightness together with color intensity, lightness or color difference.

While the technique described in the second embodiment principally does not detect a faint movement, configuration of the threshold and the like may still cause a faint movement to be detected. To avoid this, the motion area may be detected similarly on a block basis using color intensity, lightness or color difference. If a certain block is determined to be the motion area by the determination using brightness but the same block is determined not to be the motion area by the determination using color intensity, lightness or color difference, such blocks may be determined not to be the motion area so as to be excluded from the motion area mask (OR area). Further, even if there is a large movement over blocks, the determination using brightness may fail to detect the motion area due to any cause. To avoid this, if a certain block is determined not to be the motion area by the determination using brightness but the same block is determined not to be the motion area by the determination using color intensity, lightness or color difference, such blocks may be determined to be the motion area so as to be included in the motion area mask (OR area).

Further, in the determination as to whether a block is the motion area using brightness, if the number of the comparative image in which a certain block is determined to be the motion area is a predetermined number or less (or less than a predetermined number), the block may be determined not to be the motion area so as to be excluded from the motion area mask (OR area). This threshold (predetermined number) may be set according to the number of the comparative image. For example, it may be set to a half of the number of the comparative images. For example, if the number of the comparative image is "8", the threshold may be set to "4". If the number of the comparative image in which a certain block is determined to be the motion area is 4 or less (or less than 4), the block may be determined not to be the motion area so as to be excluded from the motion area mask (OR area).

(Image Compositing)

In the above-described embodiment, the sum of the motion area, which is used as the compositing area in the compositing processing, is obtained from all pairs of the base image and the comparative image. For example, in the case where an image to be generated is composed of 10 frames in total, if a certain block is determined to be the motion area in some frames (e.g. frames 1 to 3) but is determined not to be the motion area in the remaining frames (frames 4 to 10), it may be sometimes unfavorable to use the remaining frames for the compositing. Since the block is determined not to be the motion area in these frames (frames 4 to 10), these frames seem not to cause any problems even if they are used for the compositing. However, if the block includes a faint movement but does not include a movement over blocks, the user can see the faint movement in the block in the resulting image although the image should be still in the block. This ruins the above-described unique artistic feature of cinemagraphs that only an intended object moves in a completely still frame.

To avoid this, if a certain block is determined to be the motion area, rather than using all comparative images for the compositing, only the comparative images in which the block is determined to be the motion area are used for the compositing. That is, if a certain block is determined not to be the motion area in a certain comparative image, the comparative image is not composited in the block area so that the original pixels of the base image are displayed in the block area, even if the block is determined to be the motion area in the other comparative images.

Figure 31:
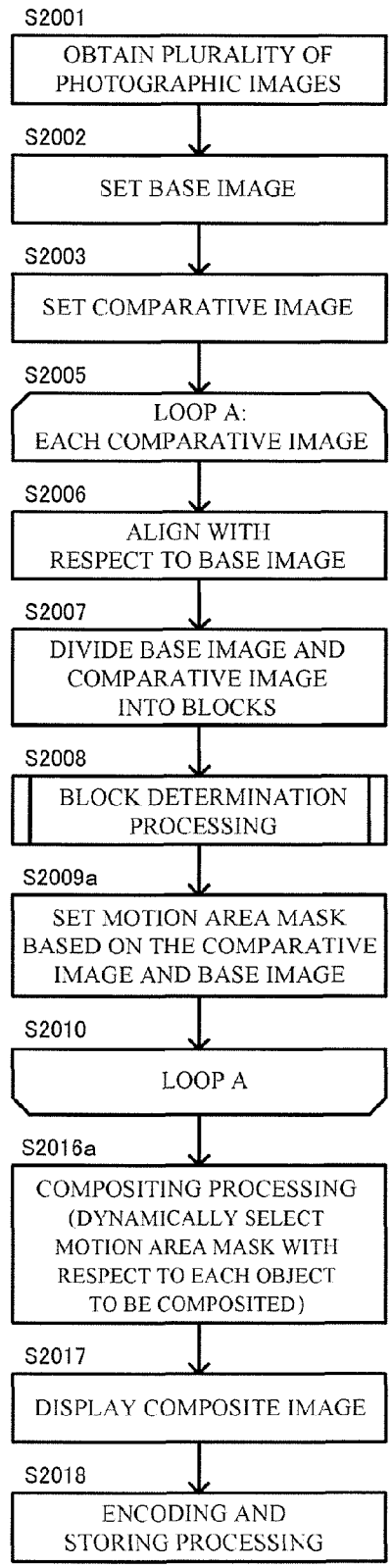
FIG. 31 is a flowchart illustrating a processing performed in an image compositing device.

FIG. 31 is a flowchart illustrating a processing that the controller unit 101 of the image compositing device 10 performs in this case in place of the processing of FIG. 26. The same steps as those in the flowchart of FIG. 26 are indicated by the same reference signs, and the repetitive description thereof is omitted.

After the block determination processing of step S2008 is complete, the controller unit 101 sets the motion area mask that corresponds to the relation between the base image and the comparative image whose motion area has been determined (S2009a). Accordingly, when the processing of loop A is complete in the processing of FIG. 31, the number of the generated motion area masks corresponds to the number of the selected comparative images. In step S2009a, the motion area masks are connected to the respective comparative images and stored. After the processing of loop A is complete (S2010), the image compositing processing is performed such that the selected comparative images are sequentially composited by using the respective motion area masks corresponding to the selected comparative images (S2016a). By this processing, only the blocks of the comparative images in which a movement with respect to the base image is detected are composited with the base image. In other words, the blocks of the comparative images that do not include any movement are not used in the composting.

Figure 32:
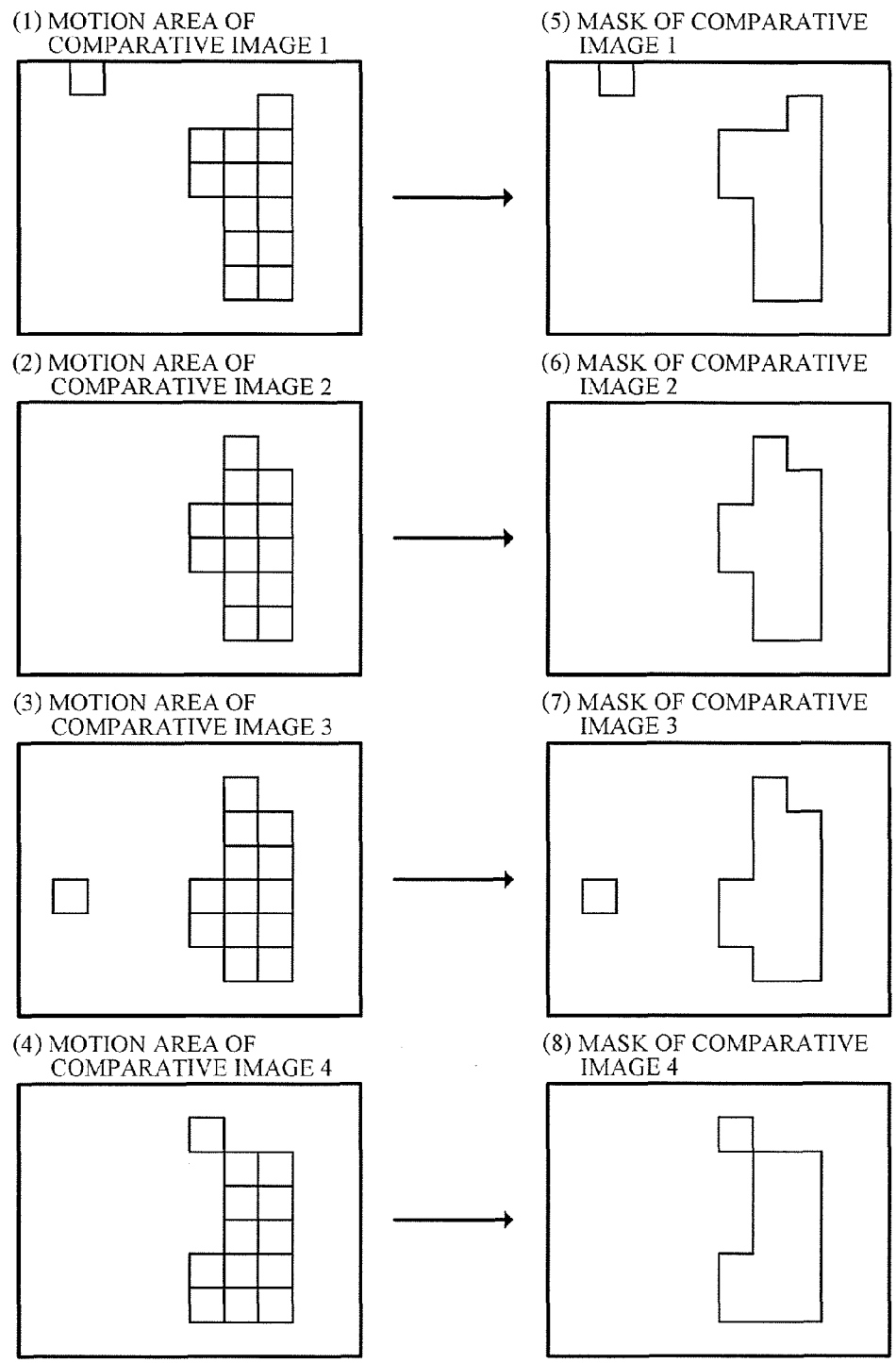
FIG. 32 are views illustrating an example of masks that are generated based on motion areas of respective comparative images.

An example of the processing of step S2016a is described with reference to FIG. 32. Comparative images 1 to 4 are set as the comparative image in this example. Accordingly, four motion areas: (1) a motion area that is determined based on the relation between the base image and comparative image 1; (2) a motion area that is determined based on the relation between the base image and comparative image 2; (3) a motion area that is determined based on the relation between the base image and comparative image 3; and (4) a motion area that is determined based on the relation between the base image and comparative image 4 are obtained as a result of the processing of loop A (S2005 through S2010). Then, four motion area masks: (5) a motion area mask corresponding to comparative image 1; (6) a motion area mask corresponding to comparative image 2; (7) a motion area mask corresponding to comparative image 3; and (8) a motion area mask corresponding to comparative image 4 are generated in step S2009a of the loop A. Then, in step S2016a, comparative images 1 to 4 are sequentially composited with the base image using the respective motion area masks. That is, the motion masks are dynamically selected according to the comparative images to be composited. As a result, it becomes possible to more precisely express a state in which an intended object moves in a completely still frame, which is the unique artistic feature of cinemagraphs.

(Determination of Motion Area Based on User Specification)

Figure 33:
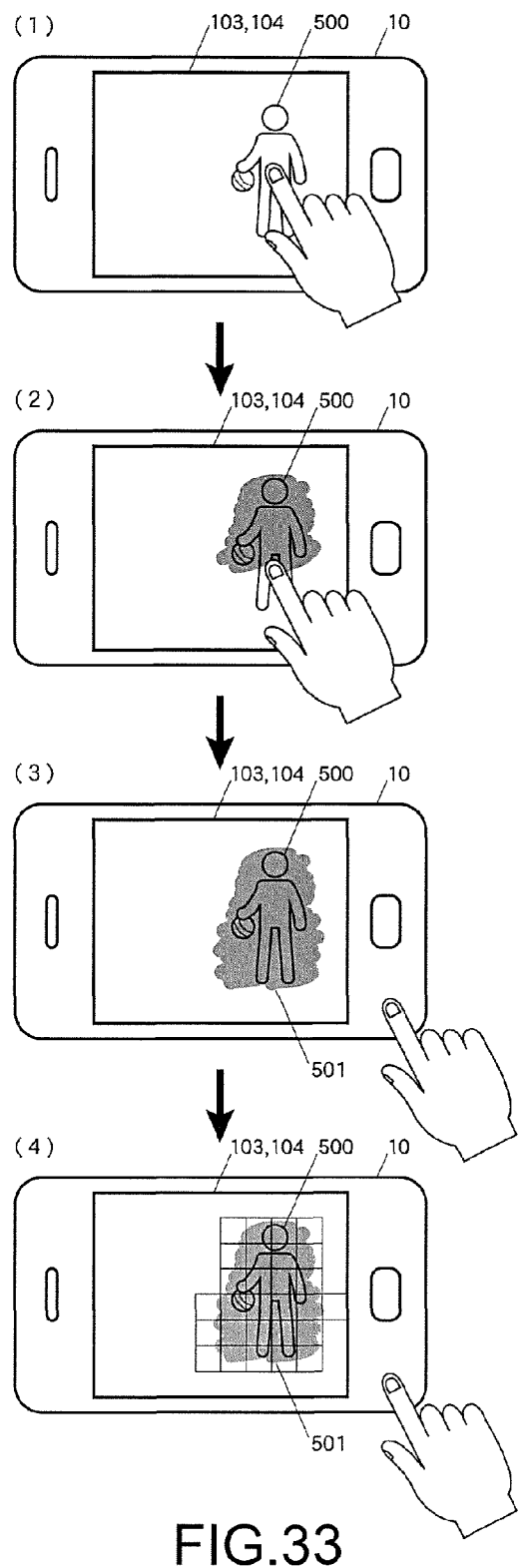
FIG. 33 are views illustrating an example where a motion area is determined based on a user operation.

In the above-described embodiment, the detection of the motion area is performed in the whole base image and comparative image. However, the device may be configured such that the user can specify an area in which the determination of the motion area is performed. For example, a base image is displayed on the touch screen of the image compositing device 10 (e.g. a smart phone) that serves as the display unit 103 and the input unit 104 (FIG. 33, (1)). In this state, the user specifies an area that includes a moving subject 500 by a drag gesture (a gesture of shifting a finger while the touch screen is being touched) (FIG. 33, (2) and (3)). As a result, an area 501 that includes the subject 500 is specified (FIG. 33, (4)). The determination of whether a block is the motion area is made on each of the blocks that at least partly includes the area 501 thus specified.

Figure 34:
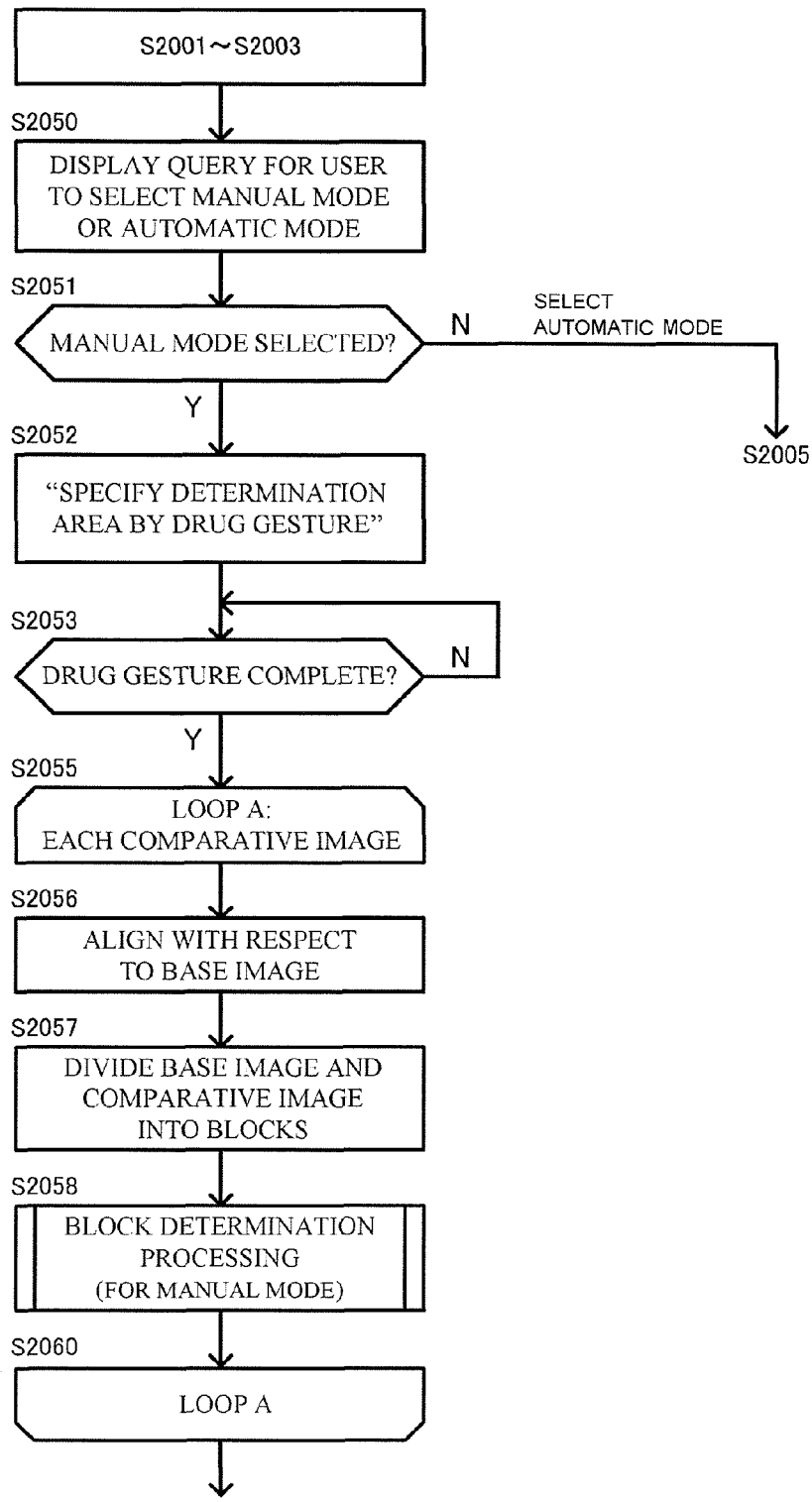
FIG. 34 is a flowchart illustrating a processing performed in an image compositing device.

FIG. 34 illustrates a processing that the controller unit 101 performs in place of the processing of FIG. 26. After the processing of steps S2001 through S2003 is complete, the controller unit 101 allows the display unit 103 to display a query to select the mode of determining the motion area from a manual mode and an automatic mode (S2050). If the user selects the automatic mode (S2051, No), the controller unit 101 performs the processing of step S2005 and the subsequent steps in FIG. 26. If the user selects the manual mode (S2051, Yes), the controller unit 101 allows the display unit 103 to display the message "Specify the area to be determined by a drug gesture." (S2052). If the controller unit 101 detects completion of the drag gesture (detects that the finger is taken off from the touch screen after detecting the drag gesture) (S2053, Yes), it performs a processing of loop A of steps S2055 through S2060, and then the process proceeds to step S2015 of FIG. 26.

Figure 35:
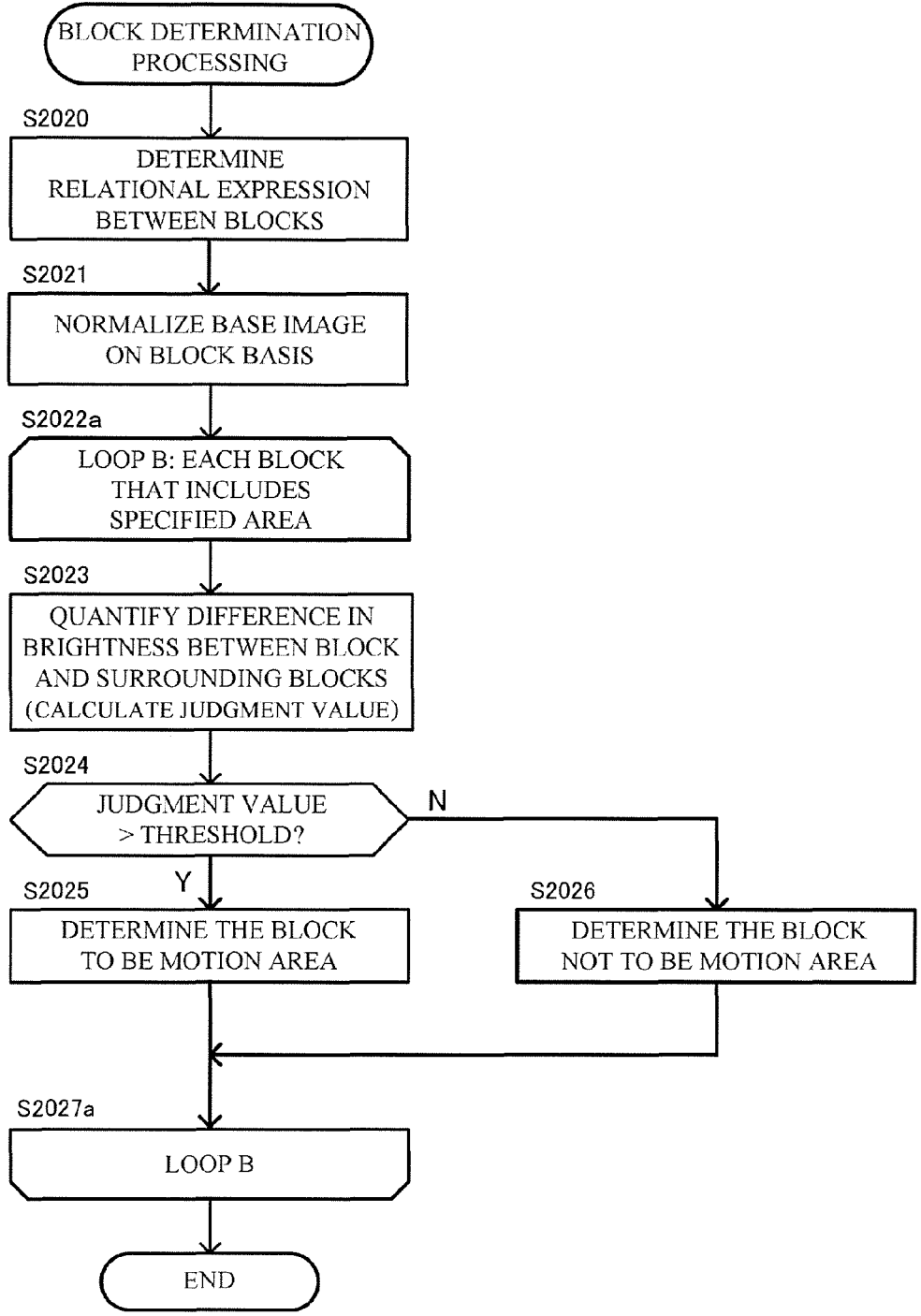
FIG. 35 is a flowchart illustrating a block determination processing.

The processing of loop A (S2055 through S2060) is identical to the processing of loop A from FIG. 26 (S2005 through S2010) except that the block determination processing (S2058) in FIG. 35 is partly different. Other than the processing in FIG. 27, the processing in loop B of the block determination processing in FIG. 35 is performed on only the blocks that at least partly include the specified area 501 (S2022a and S2027a). That is, the processing of steps S2023 through S2025 or S2026 is performed only on the blocks that at least partly include the specified area 501 so that a determination of whether a block is the motion area is made only on these blocks. The processing of loop B of step S2022a through S2027a is not performed on the blocks that do not include the specified area 501. Therefore, these blocks are not determined to be the motion area.

In this way, the determination of whether each block is the motion area is made based on the area specified by the user. Therefore, the amount of computation can be reduced compared to the processing in which the determination of whether each block is the motion area is made in the whole area. In particular, this advantageous effect is remarkable if there are many comparative images. Furthermore, this feature can prevent an area not intended by the user from being erroneously detected as the motion area, which ruins the unique feature of the resulting cinemagraph.

Further, in the processing in FIG. 34, if an operation to specify the area is burdensome for the user, he/she can select the automatic mode so that the motion area is automatically detected (S2051, No). If the user wants to set the motion area only on a desired subject, he/she can select the manual mode (S2051, Yes). In this way, the user can select a suitable mode according to his/her preference.

In the processings in FIGS. 34 and 35, the determination of whether a block is the motion area is made on each of the blocks that at least partly include the area specified by the user (semi-manual mode). However, the motion area mask may be simply generated so that it corresponds to the area specified by the user (e.g. the shape of the mask is congruent to the area 501 of FIG. 33), and the selected comparative image is sequentially composited using the generated motion area mask (full-manual mode). The device may be configured such that the user can further select the semi-manual mode or the full-manual mode in the manual mode. The user can select the semi-manual mode if he/she wants to composite images only in an area including a large movement within the specified area (he/she wants the device to make a determination of the motion area based on the specified area). The user can select the full-manual mode if he/she wants to set the whole specified area as the motion area. In this way, it is possible to generate a cinemagraph according to the intensions of the user.

(Image Compositing Device)

The foregoing embodiments are merely examples of the image compositing device and the like of the present invention. The image compositing device and the like of the present invention are not limited to the image compositing devices and the like of the embodiments, and changes and modifications may be made in the image compositing devices and the like of the embodiments without departing from the sprit of the invention and the scope recited in the claims, or they may be applied to other devices.

It should be understood that the present invention is applicable not only to smartphones but also to mobile phones, tablets and other portable terminals, and to various electronic devices and information processing devices such as personal computers. Among them, mobile phones including smart phones are optimal targets of the present invention because they are always carried by the user, can be used for communication and often include an imaging unit.

(Recording Medium)

In the above-described embodiments, various programs and data relating to the image compositing are stored in the memory unit 102 of the image compositing device 10, and the controller unit 101 reads out and executes these programs so as to perform the processings of the image compositing. In these cases, the memory unit 102 may include a recording medium (external storage) such as memory card (SD card), COMPACT FLASH (registered trademark) card, memory stick, USB memory, CD-RW (optical disk) and MO (magnetooptic disk) in addition to an internal storage such as ROM, flash ROM, hard disk and RAM, and the above-described various programs and data may be stored in the recording medium.

Figure 36:
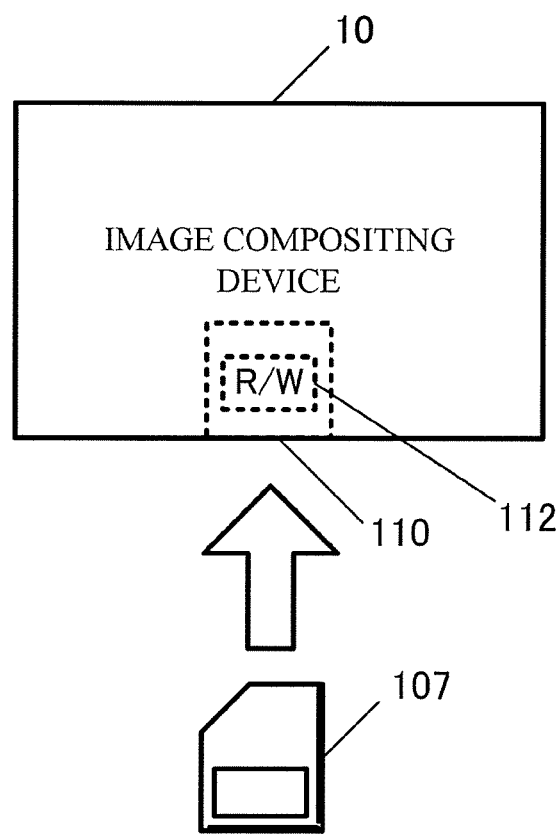
FIG. 36 is a view illustrating an example of a recording medium.

FIG. 36 is a view illustrating an example of the recording medium of such cases.

The image compositing device 10 includes a card slot 110 to receive a memory card 107 and a card reader/writer (R/W) 120 to read out information that is stored in the memory card 107 inserted in the card slot 110 and to write information on the memory card 107. The card reader/writer 120 writes a program and data recorded in the memory unit 102 on the memory card 107 according to a control of the controller unit 101. By reading out the program and data recorded on the memory card 107, an external device (e.g. a personal computer) other than the image compositing device 10 can perform the processings of the image compositing described in the above embodiments.

REFERENCE SIGNS LIST 10 image compositing device, 101 controller unit, 102 memory unit, 103 display unit, 104 input unit, 105 imaging unit, 107 memory card, 110 card slot, 120 card reader/writer

What is claimed is:

1. An image compositing devise, comprising:
a memory section to store a plurality of input images comprising a base image and a plurality of comparative images that are photographed at different times;
a base area setting section to set a plurality of base areas each relating to a subject area in the base image;
a swap area candidate setting section to set a plurality of swap area candidates in each comparative image, wherein the plurality of swap area candidates in each comparative image respectively correspond to the plurality of base areas;
a base area designating section to receive a user input designating a base area among the plurality of base areas;
a display section to display a part of the plurality of swap area candidates corresponding to the designated base area, in a selectable manner by a user; and
a composite image generating section to generate a composite image with respect to a subject area relating to the designated base area based on a subject area relating to a swap area candidate selected based on a first user operation, wherein the subject area relating to the selected swap area candidate corresponds to the subject area relating to the designated base area.

2. The image compositing device according to claim 1, further comprising,
an interference determining section to determine if an interference occurs between subject areas; and
an interference display section to display information corresponding to the occurring interference.

3. The image compositing device according to claim 1, wherein when an interference occurs between a first subject area and a second subject area, the composite image generating section generates the composite image with respect to the first and second subject areas.

4. The image compositing device according to claim 1, wherein when an interference occurs between a first subject area and any other subject area, the composite image generating section inhibits the composite image generation with respect to the first subject area.

5. The image compositing device according to claim 1, wherein when a first swap area candidate is selected based on the first user operation,
the display section displays the first swap area candidate so as to overwrite the designated base area in the base image.

6. The image compositing device according to claim 5, wherein the swap area candidate setting section is capable of replacing the first swap area candidate with another swap area candidate among the plurality of swap area candidates in response to a second user operation, so as to overwrite the designated base area in the base image.

7. The image compositing device according to claim 5, wherein the composite image generating section generates the composite image based on the first swap area candidate overwriting the designated base area in the base image in response to a third user operation.

8. The image compositing device according to claim 1, further comprising,
a subject area detecting section to detect a plurality of subject areas in the base image,
wherein the base area setting section sets the plurality of base areas so that each base area includes a single subject area.

9. The image compositing device according to claim 1, wherein the base area setting section sets a base area comprising an area designated by a fourth user operation.

10. The image compositing device according to claim 9, further comprising,
a determination section to determine whether the generation of the composite image with respect to the designated area is beneficial based on a relation between the base image and at least one of the plurality of comparative images with respect to the designated area, and to inform the user of the determination result.

11. The image compositing device according to claim 10, wherein when the determination section determines that the generation of the composite image with respect to the designated area is not beneficial, the determination section enlarges the designated area by a predetermined magnification and determines whether the generation of the composite image with respect to the enlarged designated area is beneficial.

12. The image compositing device according to claim 10, wherein the determination section determines whether the generation of the composite image with respect to the designated area is beneficial based on a difference image between the base image and at least one of the plurality of comparative images with respect to the designated area.

13. The image compositing device according to claim 1, further comprising,
a subject area detecting section to detect a plurality of subject areas in the base image and the plurality of comparative images;
a characteristic value calculating section to calculate a characteristic value with respect to each of the plurality of subject areas detected in the base image and the plurality of comparative images; and
an optimal subject area determining section to determine an optimal subject area among subject areas in the base image and the plurality of comparative images for each of the plurality of detected subject areas, based on the calculated characteristic value.

14. The image compositing device according to claim 13, wherein
the optimal subject area determining section determines an optimal subject area among subject areas in the base image and the plurality of comparative images for each of the plurality of detected subject areas, based on the calculated characteristic value, so that no interference occurs among the determined subject areas.

15. An image compositing method, comprising:
storing a plurality of input images comprising a base image and a plurality of comparative images that are photographed at different times;
setting a plurality of base areas each relating to a subject area in the base image;
setting a plurality of swap area candidates in each comparative image, wherein the plurality of swap area candidates in each comparative image respectively correspond to the plurality of base areas;
receiving a user input designating a base area among the plurality of base areas;
displaying a part of the plurality of swap area candidates corresponding to the designated base area, in a selectable manner by a user; and
generating a composite image with respect to a subject area relating to the designated base area based on a subject area relating to a swap area candidate selected based on a user operation, wherein the subject area relating to the selected swap area candidate corresponds to the subject area relating to the designated base area.

16. A non-transitory readable recording medium storing a program to make a computer execute the steps of:
storing a plurality of input images comprising a base image and a plurality of comparative images that are photographed at different times;

setting a plurality of base areas each relating to a subject area in the base image;
setting a plurality of swap area candidates in each comparative image, wherein the plurality of swap area candidates in each comparative image respectively correspond to the plurality of base areas;
receiving a user input designating a base area among the plurality of base areas;
displaying a part of the plurality of swap area candidates corresponding to the designated base area, in a selectable manner by a user; and
generating a composite image with respect to a subject area relating to the designated base area based on a subject area relating to a swap area candidate selected based on a user operation, wherein the subject area relating to the selected swap area candidate corresponds to the subject area relating to the designated base area.

* * * * *